United States Patent [19]

Satonaka et al.

[11] Patent Number: 5,749,427
[45] Date of Patent: May 12, 1998

[54] CONSTANT SPEED REGULATOR APPARATUS

[75] Inventors: Hisashi Satonaka; Setsuo Tokoro, both of Susono, Japan

[73] Assignee: Toyota Jidosha Kabushiki Kaisha, Aichi-ken, Japan

[21] Appl. No.: 678,213

[22] Filed: Jul. 11, 1996

[30] Foreign Application Priority Data

Sep. 18, 1995 [JP] Japan ................... 7-238664

[51] Int. Cl.$^6$ ................ B60K 31/04; G06F 15/16
[52] U.S. Cl. ................ 180/179; 364/426.041
[58] Field of Search ................ 180/174, 178, 180/179; 364/426.02, 426.04, 431.07, 424.1

[56] References Cited

U.S. PATENT DOCUMENTS

| | | | |
|---|---|---|---|
| 4,815,533 | 3/1989 | Onishi et al. | 180/178 |
| 4,862,367 | 8/1989 | Tada et al. | 364/426.04 |
| 4,967,357 | 10/1990 | Mimura et al. | 364/426.04 |
| 5,154,250 | 10/1992 | Murai | 180/179 |
| 5,189,618 | 2/1993 | Tsujii et al. | 364/426.04 |
| 5,203,423 | 4/1993 | Fujiwara et al. | 180/179 |
| 5,270,934 | 12/1993 | Kobayashi | 364/426.04 |
| 5,329,454 | 7/1994 | Takada et al. | 364/426.04 |
| 5,350,034 | 9/1994 | Sato | 180/197 |
| 5,434,786 | 7/1995 | Sakonjyu | 364/426.04 |

FOREIGN PATENT DOCUMENTS

| | | |
|---|---|---|
| 63-46929 | 2/1988 | Japan . |
| 63-97439 | 4/1988 | Japan . |
| 1-182136 | 7/1989 | Japan . |
| 2-220932 | 9/1990 | Japan . |
| 2-231232 | 9/1990 | Japan . |
| 6-144080 | 5/1994 | Japan . |

*Primary Examiner*—Brian L. Johnson
*Assistant Examiner*—Bridget Avery
*Attorney, Agent, or Firm*—Kenyon & Kenyon

[57] ABSTRACT

A constant speed regulator apparatus includes a vehicle speed sensing unit which detects a vehicle speed of an automotive vehicle. An idle switch unit detects an OFF state of a throttle valve. A throttle adjusting actuator adjusts a throttle opening angle of the throttle valve to vary the vehicle speed. A target speed determining unit determines a target speed by using the vehicle speed which is detected by the vehicle speed sensing unit immediately after the OFF state of the throttle valve is detected by the idle switch unit. An actuator control unit regulates the throttle adjusting actuator so that the vehicle speed is maintained at the target speed determined by the target speed determining unit.

15 Claims, 17 Drawing Sheets

F I G. 1
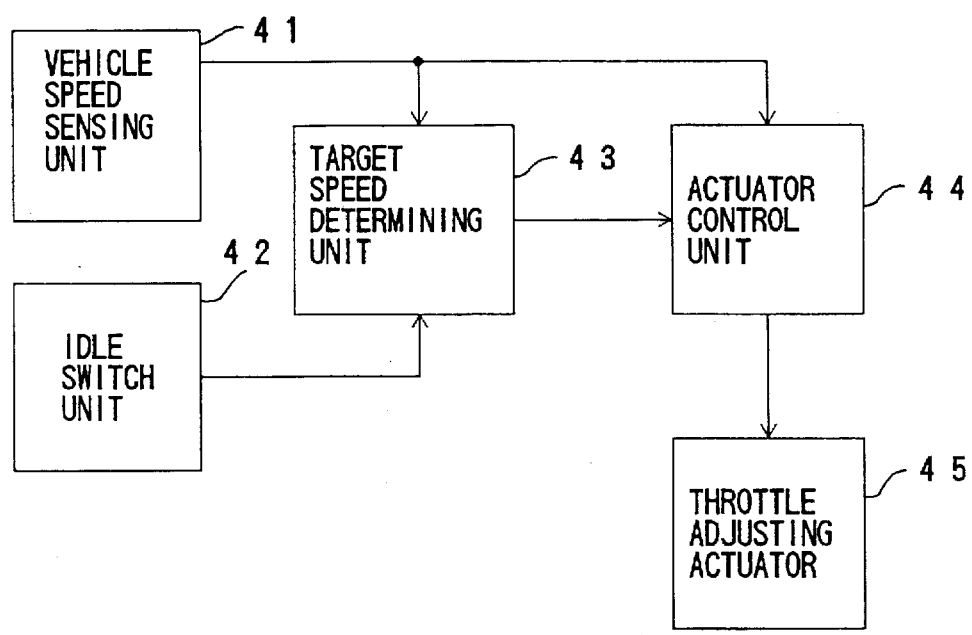

ACCELERATOR OPENING ANGLE

THROTTLE OPENING ANGLE

IDLE SWITCH

VEHICLE SPEED

ACTUATOR OPENING ANGLE

TIME

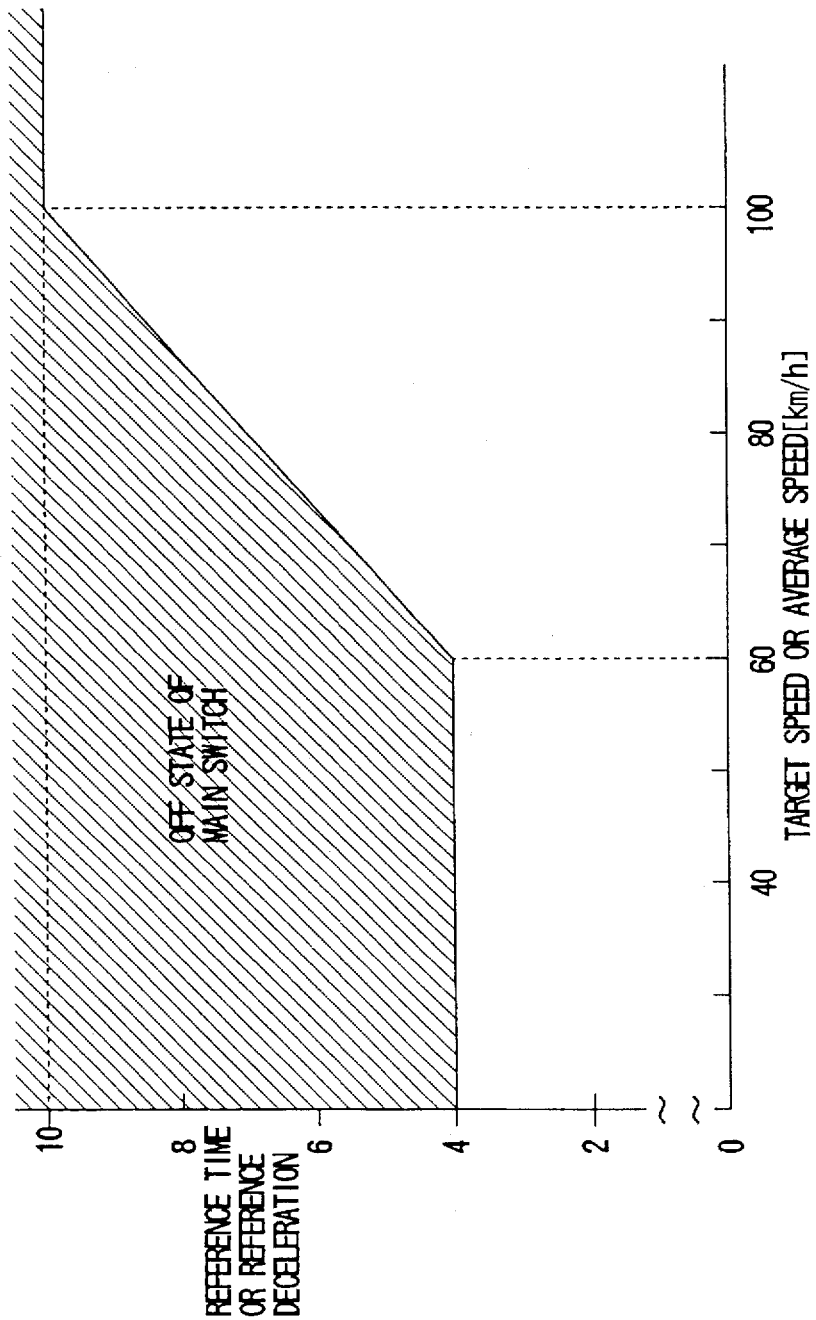

F I G. 1 1
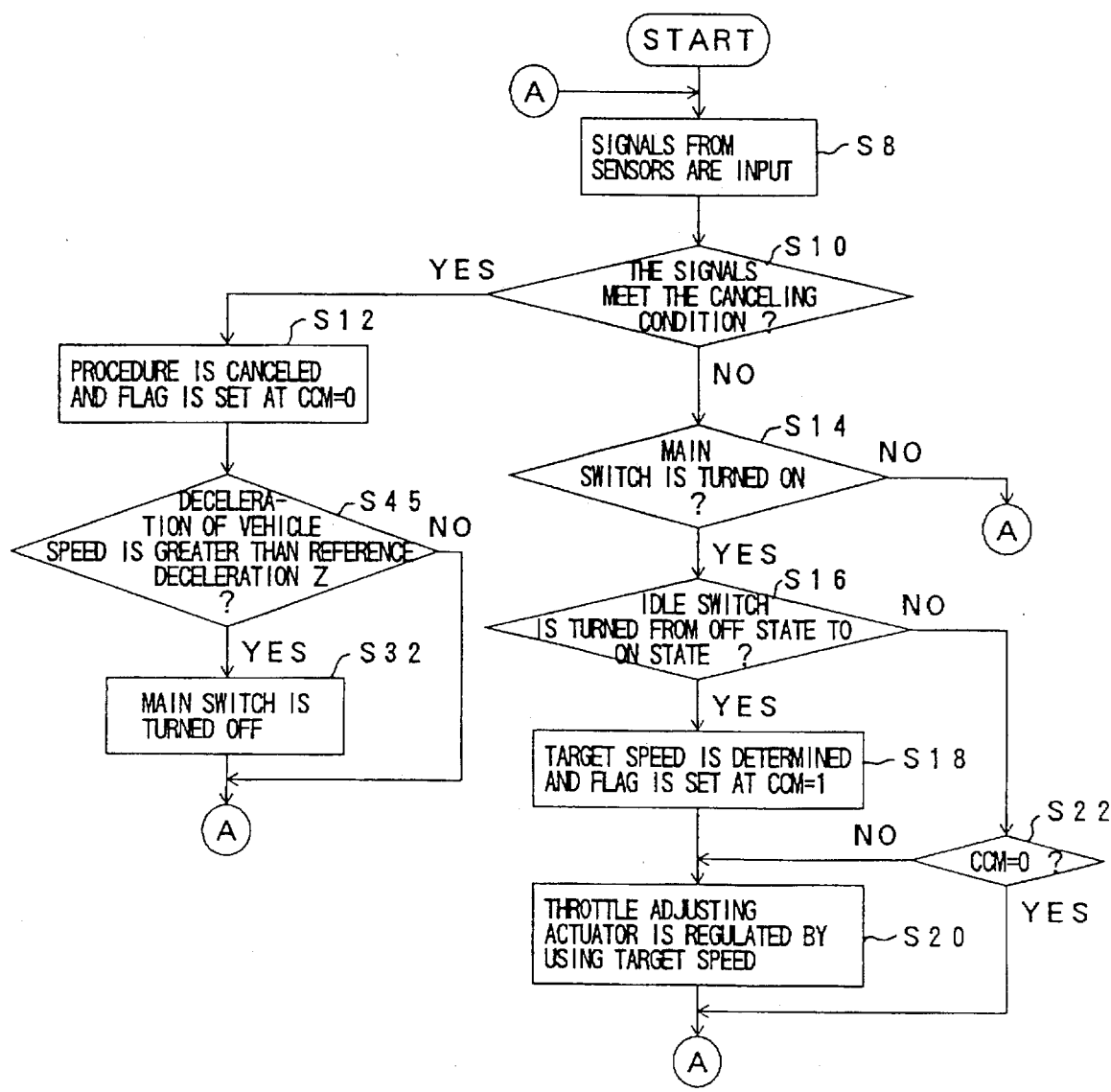

CONSTANT SPEED REGULATOR APPARATUS

BACKGROUND OF THE INVENTION

(1) Field of the Invention

The present invention relates to a constant speed regulator apparatus which controls a throttle opening angle of a throttle valve and varies a vehicle speed by using a throttle adjusting actuator, in order to maintain the vehicle speed at a target speed.

(2) Description of the Related Art

A conventional constant speed regulator apparatus is known. In the conventional constant speed regulator apparatus, a target speed is determined by using a vehicle speed which is detected immediately after an OFF state of an accelerator pedal is sensed by an accelerator switch. The target speed is used to adjust the throttle opening angle of the throttle valve and vary the vehicle speed, so that the vehicle speed is maintained at the target speed. For example, Japanese Laid-Open Patent Application No. 1-182136 discloses such an apparatus.

The conventional constant speed regulator apparatus, disclosed in the above publication, requires an accelerator switch attached to an accelerator pedal of an automotive vehicle as well as a vehicle speed sensor attached to the vehicle. The accelerator switch senses the OFF state of the accelerator pedal when it is released by a vehicle operator. More specifically, the accelerator switch is turned OFF when the accelerator pedal is pressed down, and the accelerator switch is turned ON when the accelerator pedal is released. The OFF state of the accelerator pedal is sensed when the accelerator switch is turned from the OFF state to the ON state.

In the above conventional apparatus, the vehicle speed sensor detects a vehicle speed immediately after the OFF state of the accelerator pedal is sensed. During a constant speed running procedure, a target speed is determined by using the thus detected vehicle speed, and the output of the engine is regulated by controlling the throttle opening angle of the throttle valve, in order to maintain the vehicle speed at the target speed.

In the above conventional apparatus, the constant speed running procedure is canceled and restarted if the accelerator pedal is pressed when the constant speed running procedure is performed. Even if the vehicle operator erroneously touches the accelerator pedal during the constant speed running, the accelerator switch is turned from the OFF state to the ON state, and therefore the procedure is canceled and restarted. Since a target speed is determined by using the vehicle speed detected immediately after the OFF state of the accelerator pedal is sensed, there is a problem in that the target speed after the procedure is restarted is greatly varied from the target speed before the procedure is canceled.

For example, if the accelerator pedal is erroneously touched when the vehicle is running at a constant speed on an uphill road, the target speed determined by the above conventional apparatus becomes greatly small, and the vehicle speed is abruptly decreased due to the constant speed running procedure being restarted. The vehicle operator may feel a shock in such cases.

The above conventional apparatus requires a throttle sensor and an idle switch in order to control the output of the engine, and requires, in addition, the accelerator switch mentioned above. The throttle sensor detects a throttle opening angle of the throttle valve. The idle switch detects an OFF state of the throttle valve. In the case of the above conventional apparatus, the total number of the required parts becomes large and the cost becomes high in order to provide the constant speed running function.

SUMMARY OF THE INVENTION

An object of the present invention is to provide an improved constant speed regulator apparatus in which the above-described problems are eliminated.

Another object of the present invention is to provide a constant speed regulator apparatus which reliably prevents the target speed from being varied during the constant-speed running of the vehicle even when an accelerator pedal is erroneously pressed by a vehicle operator.

Still another object of the present invention is to provide a constant speed regulator apparatus which reduces a total number of required parts and provides a reliable function of constant-speed regulation.

The above-mentioned objects of the present invention are achieved by a constant speed regulator apparatus which includes: a vehicle speed sensing unit detecting a vehicle speed of an automotive vehicle; an idle switch unit detecting an OFF state of a throttle valve; a throttle adjusting actuator adjusting a throttle opening angle of the throttle valve to vary the vehicle speed; a target speed determining unit determining a target speed by using the vehicle speed which is detected by the vehicle speed sensing unit immediately after the OFF state of the throttle valve is detected by the idle switch unit; and an actuator control unit regulating the throttle adjusting actuator so that the vehicle speed is maintained at the target speed determined by the target speed determining unit.

The constant speed regulator apparatus of the present invention determines the target speed for the vehicle only after the OFF state of the throttle valve is detected. Therefore, it is possible for the constant speed regulator apparatus of the present invention to reliably prevent the target speed from being varied during the constant-speed running of the vehicle even when the accelerator pedal is erroneously pressed by the vehicle operator. Further, since the constant speed regulator apparatus of the present invention does not require an accelerator sensor, it is possible to reduce the total number of the required parts while a reliable function of constant-speed regulation is provided.

BRIEF DESCRIPTION OF THE DRAWINGS

The above and other objects, features and advantages of the present invention will become more apparent from the following detailed description when read in conjunction with the accompanying drawings in which:

FIG. 1 is a block diagram showing the basic principle of a constant speed regulator apparatus according to the present invention;

FIG. 10 is a diagram of a map used by the ECU when the constant-speed running procedure in FIG. 9 is executed;

FIG. 11 is a flowchart for explaining a fifth embodiment of the constant-speed running procedure executed by the ECU;

DESCRIPTION OF THE PREFERRED EMBODIMENTS

Figure 2:
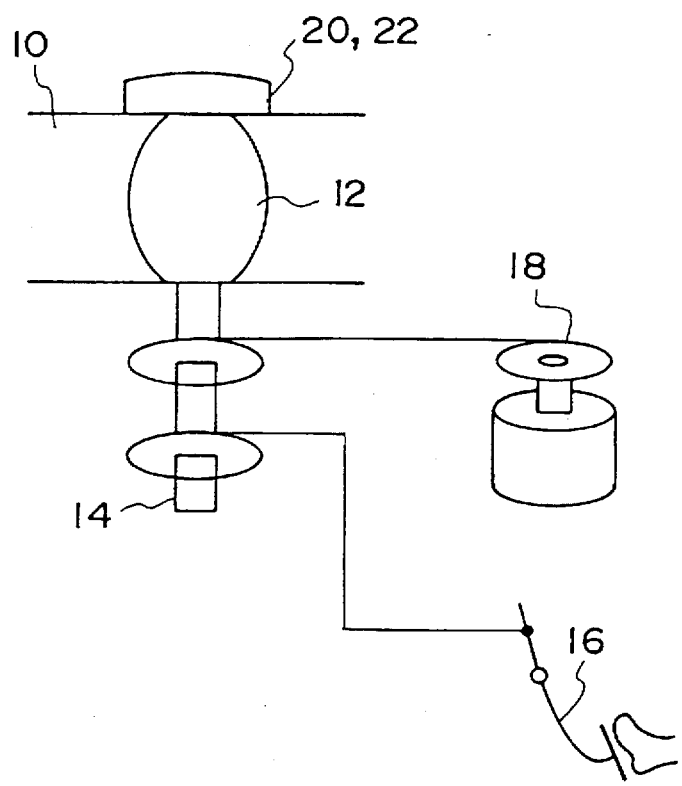
FIG. 2 is a diagram of a throttle valve regulating system to which various embodiments of the present invention are applied.

A description will now be given of the preferred embodiments of the present invention with reference to the accompanying drawings.

FIG. 1 shows the basic principle of a constant speed regulator apparatus according to the present invention.

Referring to FIG. 1, the constant speed regulator apparatus includes a vehicle speed sensing unit 41 which detects a vehicle speed of an automotive vehicle. An idle switch unit 42 detects an OFF state of a throttle valve of the vehicle. A throttle adjusting actuator 45 adjusts a throttle opening angle of the throttle valve to vary the vehicle speed of the vehicle. A target speed determining unit 43 determines a target speed by using the vehicle speed which is detected by the vehicle speed sensing unit 41 immediately after the OFF state of the throttle valve is detected by the idle switch unit 42. An actuator control unit 44 regulates the throttle adjusting actuator 45 so that the vehicle speed is maintained at the target speed determined by the target speed determining unit 43.

The constant speed regulator apparatus of the present invention determines the target speed for the vehicle only after the OFF state of the throttle valve is detected. Accordingly, it is possible to reliably prevent the target speed from being varied during the constant speed running of the vehicle even when the accelerator pedal is erroneously pressed by the vehicle operator. Further, since the constant speed regulator apparatus of the present invention does not require an accelerator sensor, it is possible to reduce the total number of the required parts while a reliable function of constant-speed regulation is provided.

FIG. 2 shows a throttle valve regulating system to which various embodiments of the present invention are applied.

Referring to FIG. 2, a throttle valve 12 is included in an intake pipe 10. The throttle valve 12 is secured to a rotating shaft 14, and the rotating shaft 14 is rotated. The throttle valve 12 is rotated in accordance with the rotation of the rotating shaft 14 so that a sectional area of an intake passage connected to an internal combustion engine (not shown) is varied. A throttle opening angle of the throttle valve 12 is determined according to the sectional area of the intake passage.

When an accelerator pedal 16 of the vehicle is pressed by a vehicle operator, the throttle valve 12 is rotated so as to increase the throttle opening angle. When a throttle adjusting actuator 18 is driven, the throttle valve 12 is rotated so as to adjust the throttle opening angle of the throttle valve 12. That is, the throttle opening angle of the throttle valve 12 is increased or decreased by using the throttle adjusting actuator 18.

The throttle adjusting actuator 18 is used to vary the throttle opening angle to be greater than a predetermined angle $\Theta 1$ that is a minimum level of throttle opening angle of the throttle valve 12 derived by using the accelerator pedal 16. However, the throttle adjusting actuator 18 is not used to vary the throttle opening angle of the throttle valve 12 by an amount that is smaller than the predetermined angle $\Theta 1$ that is the minimum level of throttle opening angle of the throttle valve 12.

As shown in FIG. 2, a throttle sensor 20 and an idle switch 22 are attached to the throttle valve 12. The throttle sensor 20 detects a throttle opening angle from a rotating angle of the throttle valve 12, and outputs a signal indicating the throttle opening angle. The idle switch 22 detects an ON/OFF state of the throttle valve 12 from the rotating angle of the throttle valve 12. The idle switch 22 outputs a signal indicating the ON/OFF state of the throttle valve 12 related to its idle position thereof.

When the throttle valve 12 is at the idle position (that is, when the throttle opening angle of the throttle valve 12 is zero), the idle switch 22 outputs an ON signal indicating the OFF state of the throttle valve 12. Otherwise the idle switch 22 outputs an OFF signal indicating the ON state of the throttle valve 12 (the throttle opening angle of the throttle valve 12 is not zero).

Figure 3:
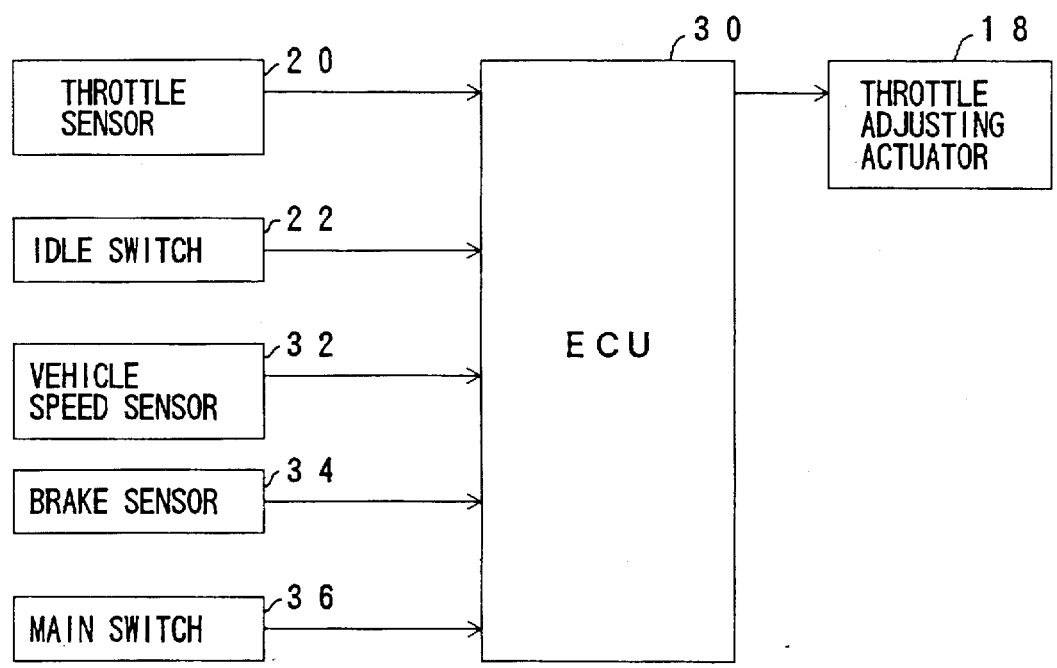
FIG. 3 is a block diagram of an electronic control unit (ECU) which controls the throttle valve regulating system in FIG. 2.

FIG. 3 shows an electronic control unit (ECU) which controls the throttle valve regulating system in FIG. 2.

Referring to FIG. 3, an electronic control unit (ECU) 30 which controls the throttle valve regulating system in FIG. 2 is provided within the automotive vehicle. As shown in FIG. 3, the throttle sensor 20 and the idle switch 22 are connected to inputs of the ECU 30, and an output of the ECU 30 is connected to the throttle adjusting actuator 18.

The signal indicating the throttle opening angle of the throttle valve 12, from the throttle sensor 20, is input to the ECU 30. The ON/OFF signal indicating the OFF/ON state of the throttle valve 12, from the idle switch 22, is input to the ECU 30.

In addition, a vehicle speed sensor 32, a brake sensor 34 and a main switch 36 are provided within the automotive vehicle. In order to control the throttle valve regulating system in FIG. 2 to which various embodiments of the present invention are applied, it is necessary that the vehicle speed sensor 32, the brake sensor 34 and the main switch 36 are connected to inputs of the ECU 30, in addition to the throttle sensor 20 and the idle switch 22.

A signal indicating a vehicle speed of the automotive vehicle from the vehicle speed sensor 32 is input to the ECU 30. A signal indicating an ON/OFF state of a brake pedal of the vehicle from the brake sensor 43 is input to the ECU 30. A signal indicating a starting command to start a constant-speed running procedure for the throttle valve regulating system or not, from the main switch 36, is input to the ECU 30.

The vehicle speed sensing unit 41 in FIG. 1 corresponds to a portion of the ECU 30 which inputs the vehicle speed signal from the vehicle speed sensor 32. The idle switch unit 42 in FIG. 1 corresponds to a portion of the ECU 30 which inputs the ON/OFF state signal of the throttle valve 12 from the idle switch 22. The throttle adjusting actuator 45 in FIG. 1 corresponds to the throttle adjusting actuator 18 to which a control signal from the ECU 30 is output. The throttle valve regulating system in FIG. 2 is thus controlled in accordance with the control signal output by the ECU 30.

Figure 4:
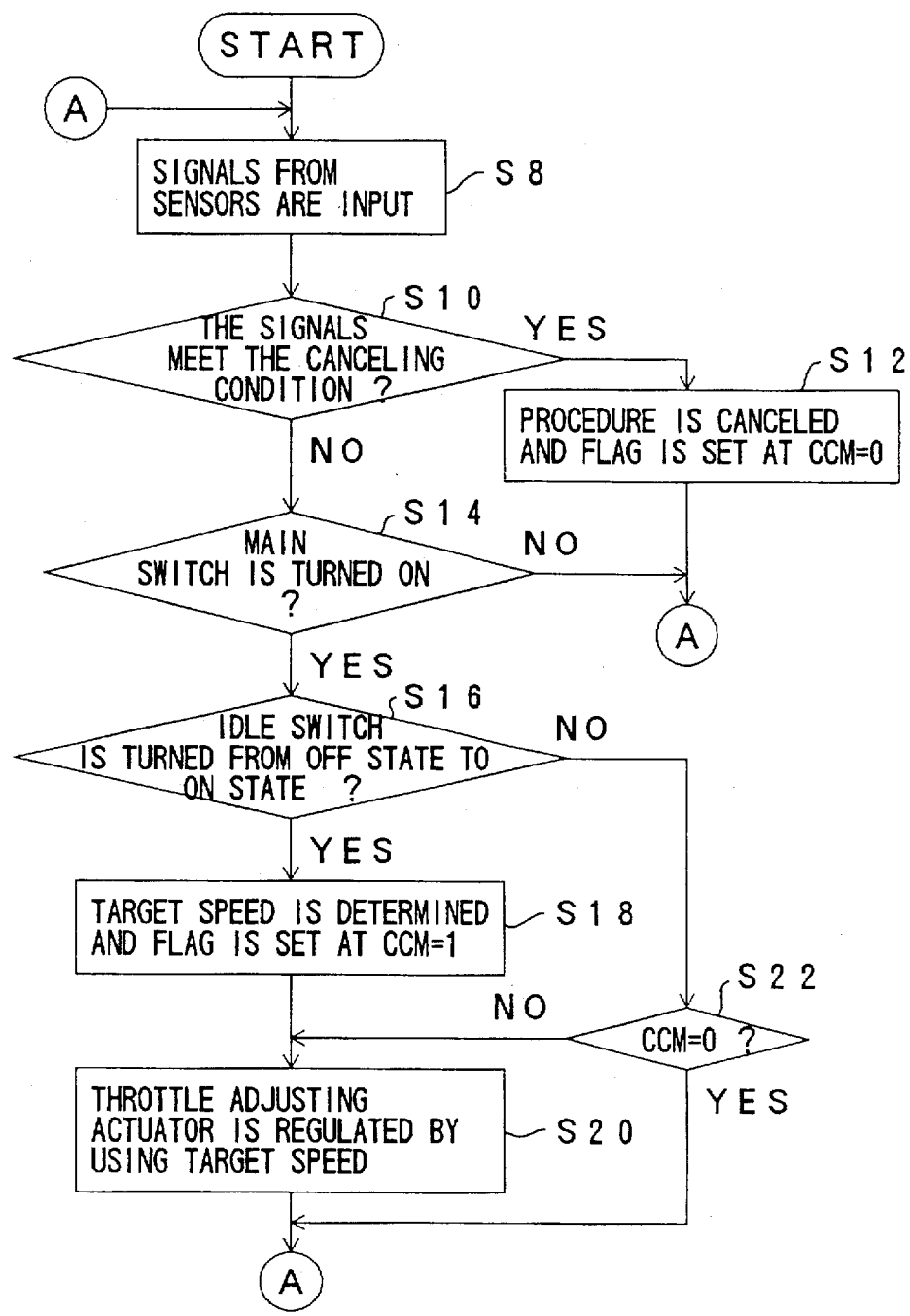
FIG. 4 is a flowchart for explaining a first embodiment of a constant-speed running procedure executed by the ECU in FIG. 3.

FIG. 4 shows a first embodiment of a constant-speed running procedure executed by the ECU 30 in FIG. 3.

Referring to FIG. 4, the ECU 30, at step S8, inputs at the present cycle the signal output from the throttle sensor 20, the signal output from the idle switch 22, the signal output from the vehicle speed sensor 32, the signal output from the brake sensor 34, and the signal output from the main switch 36, respectively.

After the step S8 is performed, step S10 detects whether the signals from the above-mentioned sensors meet a canceling condition of the constant-speed running procedure. In the present embodiment, when the signal from the brake sensor 34 indicates the ON state of the brake pedal, it is determined that the signals from the above sensors meet the canceling condition.

When the result at the step S10 is affirmative (the signals meet the canceling condition), step S12 is performed. Step S12 cancels performing the constant-speed running procedure in FIG. 4, and sets a control-state flag CCM at zero (CCM=0). After the step S12 is performed, the procedure will be transferred to the step S8 at the start of a following cycle, as indicated by the character "A" in FIG. 4.

When the result at the step S10 is negative (the signals do not meet the canceling condition), step S14 is performed. Step S14 detects whether the signal from the main switch 36 is ON, that is, whether the signal indicates the starting command to start the constant-speed running procedure for the throttle valve regulating system.

When the result at the step S14 is negative (the signal from the main switch 36 is OFF), it is determined that starting the constant-speed running procedure is not needed. The procedure will be transferred to the step S8 at the start of the following cycle, as indicated by the character "A" in FIG. 4.

When the result at the step S14 is affirmative (the signal from the main switch 36 is ON), step S16 is performed. Step S16 detects whether the idle switch 22 is turned from the OFF state at the previous cycle to the ON state at the present cycle. That is, the step S16 detects whether the ON state of the throttle valve 12, which is indicated by the previous OFF signal from the idle switch 22, is changed to the OFF state of the throttle valve 12, which is indicated by the present ON signal from the idle switch 22.

When the result at the step S16 is affirmative (the idle switch 22 is turned from the OFF state to the ON state), step S18 is performed. Step S18 determines a target speed by using the vehicle speed indicated by the signal presently output from the vehicle speed sensor 32. In addition, step S18 sets the control-state flag CCM at one (CCM=1), which indicates that the constant-speed running procedure is to be performed.

After the step S18 is performed, step S20 regulates the throttle adjusting actuator 18 by outputting to the throttle adjusting actuator 18 a control signal 30 indicating the target speed determined at the step S18, so that the vehicle speed is varied from the previously detected vehicle speed to the target speed presently determined by the step S18 so as to maintain the vehicle speed at the target speed. The control signal from the ECU 30 which applies the target speed to the throttle adjusting actuator 18 adjusts the throttle opening angle of the throttle valve 12 and varies the vehicle speed. After the step S20 is performed, the procedure will be transferred to the step S8 at the start of the following cycle, as indicated by the character "A" in FIG. 4.

When the result at the step S16 is negative (the idle switch 22 is not turned from the OFF state into the ON state), step S22 is performed. Step S22 detects whether the control-state flag CCM is equal to zero.

When the result at the step S22 is affirmative (CCM=0), the procedure will be transferred to the step S8 at the start of the following cycle, as indicated by the character "A" in FIG. 4. That is, it is determined by the flag CCM that the constant-speed running procedure is not performed.

When the result at the step S22 is negative (CCM=1), the step S20 of the regulation of the throttle adjusting actuator 18 is performed. That is, it is determined by the flag CCM that the constant-speed running procedure is performed.

The target speed determining unit 43 in FIG. 1 corresponds to the ECU 30 which performs the step S18 of the target speed determination in FIG. 4. The actuator control unit 44 in FIG. 1 corresponds to the ECU 30 which performs the step S20 of the regulation of the throttle adjusting actuator in FIG. 4. In addition, the actuator control unit 44 in FIG. 1 includes various units which correspond to the ECU 30 performing other additional steps which will be described later with reference to the accompanying drawings. Further, the target speed determining unit 43 in FIG. 1 includes various units which correspond to the ECU 30 performing other additional steps which will be described later with reference to the accompanying drawings.

Figure 5A:
FIGS. 5A through 5E are timing charts for explaining operations of the elements of the throttle valve regulating system.
Figure 5B:
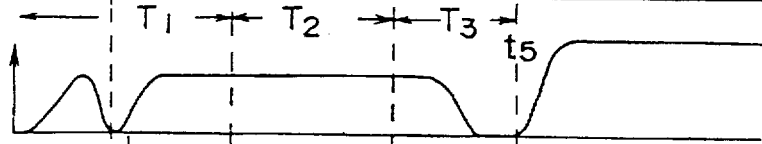
Figure 5C:
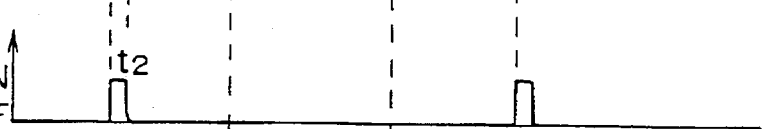
Figure 5D:
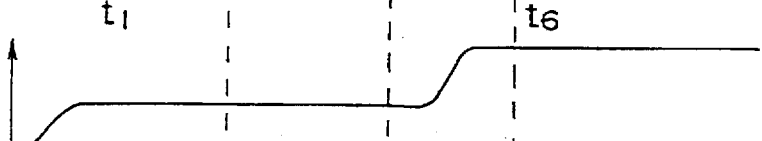
Figure 5E:
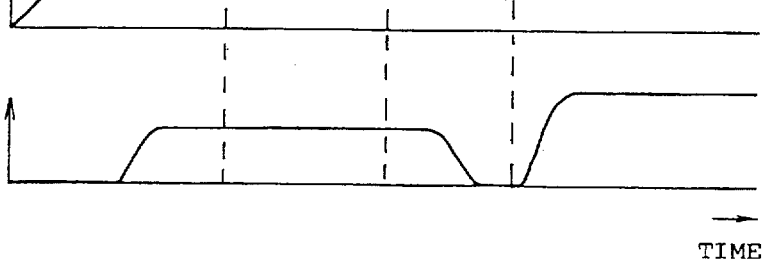

FIGS. 5A through 5E are timing charts for explaining operations of the elements of the throttle valve regulating system in FIG. 2. FIG. 5A shows the accelerator opening angle of the accelerator pedal 16. FIG. 5B shows the throttle opening angle of the throttle valve 12. FIG. 5C shows the ON/OFF state of the idle switch 22. FIG. 5D shows a change of the vehicle speed of the automotive vehicle. FIG. 5E shows an actuator opening angle of the throttle adjusting actuator 18.

It is supposed that, during a period T1, the vehicle operator turns the main switch 36 ON, presses down the accelerator pedal 16 so that the vehicle accelerates, and then releases the accelerator pedal 16 at a time t1, as shown in FIG. 5A.

The throttle opening angle of the throttle valve 12 is varied accordingly during the period T1, as shown in FIG.

5B. The idle switch 22 is turned from the OFF state (the OFF signal is output) to the ON state (the ON signal is output) at the time t1. Since the constant-speed running procedure in FIG. 4 is performed during the period T1, the vehicle speed is maintained at a target speed as shown in FIG. 5D. In addition, since performing the constant-speed running procedure in FIG. 4 is started, the throttle opening angle of the throttle valve 12 is adjusted by the throttle adjusting actuator 18, and the ON/OFF state of the idle switch 22 is changed from the ON state to the OFF state at a time t2.

When the throttle opening angle of the throttle valve 12 is varied as shown in FIG. 5B, the actuator opening angle of the throttle adjusting actuator 18 is varied accordingly as shown in FIG. 5E.

It is supposed that, during a period T2, the vehicle operator erroneously presses down the accelerator pedal 16. Since the OFF state of the idle switch 22 remains unchanged during the period T2, it is possible to reliably present the vehicle speed from being varied during the constant-speed running of the vehicle. The target speed previously determined is not varied during the period T2.

It is supposed that, during a period T3, the vehicle operator forcefully presses down the accelerator pedal 16 so that the vehicle further accelerates, and then releases the accelerator pedal 16 at a time t5, as shown in FIG. 5A.

In order to reduce the acceleration of the vehicle speed, the ECU 30 controls the throttle adjusting actuator 18 so that the throttle opening angle of the throttle adjusting actuator 18 is decreased to zero, as shown in FIG. 5B. Since the vehicle operator releases the accelerator pedal 16 at the time t5, the idle switch 22 is turned from the OFF state to the ON state at the time t5. The ECU 30 starts performing the constant-speed running procedure in FIG. 4 immediately after the OFF state of the throttle valve 12 is detected at the time t5. The idle switch 22 is turned from the ON state to the OFF state at a time t6, as shown in FIG. 5C. Accordingly, the regulation of the throttle adjusting actuator 18 is performed so that the vehicle speed is maintained at a new target speed as shown in FIG. 5D. The new target speed is determined by the ECU 30 at the time t5 when the OFF state of the throttle valve 12 (indicated by the ON signal from the idle switch 22) is detected.

The above-described first embodiment determines the target speed for the vehicle only after the OFF state of the throttle valve 12 is detected. The detection of the OFF state of the throttle valve 12 is performed by detecting that the previous OFF state of the idle switch 22 is changed to the present ON state. Therefore, it is possible to reliably prevent the target speed from being varied during the constant-speed running of the vehicle even when the accelerator pedal 16 is erroneously pressed by the vehicle operator. Further, since the above first embodiment does not require an accelerator sensor which detects the OFF state of the accelerator pedal 16, it is possible to reduce the total number of the required parts while a reliable function of constant-speed regulation is provided.

In the above-described first embodiment, in order to restart performing the constant-speed running procedure after the constant-speed running procedure is canceled, it is necessary that the vehicle operator presses down and releases the accelerator pedal 16 to change the OFF state of the idle switch 22 to the ON state. The operation by the vehicle operator is not always easy enough to restart performing the constant-speed running procedure. To avoid the above problem of the first embodiment, the present invention provides a second embodiment of the constant-speed running procedure which follows.

Figure 6:
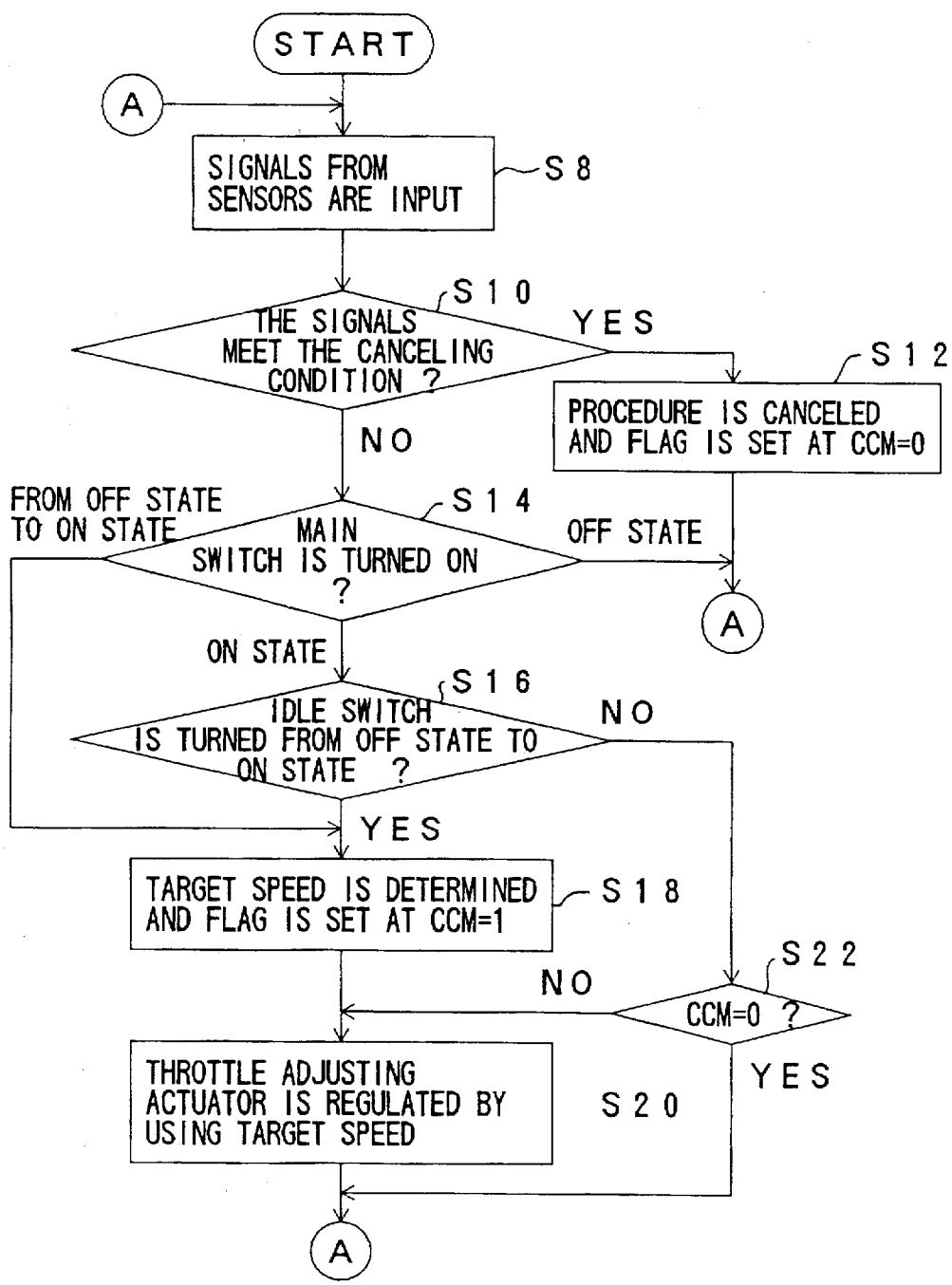
FIG. 6 is a flowchart for explaining a second embodiment of the constant-speed running procedure executed by the ECU.

FIG. 6 shows the second embodiment of the constant-speed running procedure executed by the ECU 30 in FIG. 3. In FIG. 6, the steps S8, S10 and S12 of the present embodiment are the same as the corresponding steps S8, S10 and S12 of the first embodiment in FIG. 4 are designated by the same reference numerals, and a description thereof will be omitted.

Referring to FIG. 6, when the result at the step S10 is negative (the signals do not meet the canceling condition), step S24 is performed. Step S24 checks the previous and present ON/OFF states of the main switch 36. That is, the step S24 detects whether the previous signal from the main switch 36 is ON, and detects whether the present signal from the main switch 36 is ON.

As described above, when the signal from the main switch 36 is ON, it indicates that performing the constant-speed running procedure is to be started. When the signal from the main switch 36 is OFF, it indicates that performing the constant-speed running procedure is not to be started.

When it is detected at the step S24 is that the present signal from the main switch 36 is OFF, it is determined that starting constant-speed running procedure at the present cycle is not needed. The procedure will be transferred to the step S8 at the start of a following cycle, as indicated by the character "A" in FIG. 6.

When it is detected at the step S24 that both the previous signal and the present signal from the main switch 36 are ON, the step S16 which is the same as the corresponding step S16 in FIG. 4 is performed. That is, the step S16 detects whether the ON state of the throttle valve 12, which is indicated by the previous OFF signal from the idle switch 22 at the previous cycle, is changed to the OFF state of the throttle valve 12, which is indicated by the present ON signal from the idle switch 22 at the present cycle.

When it is detected at the step S24 that the previous signal from the main switch 36 is OFF and that the present signal from the main switch 36 is ON, the step S18 which is the same as the corresponding step S18 in FIG. 4 is performed, and the step S16 is not performed. That is, the step S18 determines a target speed for the vehicle by using the vehicle speed indicated by the signal presently output from the vehicle speed sensor 32. Also, the step S18 sets the control-state flag CCM at one (CCM=1).

In FIG. 6, the steps S16, S18, S20 and S22 of the present embodiment which are the same as the corresponding steps in FIG. 4 are designated by the same reference numerals, and a description thereof will be omitted.

In the above-described second embodiment, if the main switch 36 is turned from the previous OFF state to the present ON state, the target speed determination (the step S18) and the regulation of the throttle adjusting actuator 18 (the step S20) are performed even when the idle switch 22 is not turned from the OFF state to the ON state. Thus, in order to restart performing the constant-speed running procedure after the constant-speed running procedure is canceled, it is not necessary that the vehicle operator presses down and releases the accelerator pedal 16 to change the OFF state of the idle switch 22 to the ON state. The ease of the operation by the vehicle operator is improved by the second embodiment.

In the above-described second embodiment, when the signal from the main switch 36 is ON, the step S18 and the step S20 are always performed. If the vehicle operator releases the accelerator pedal 16 when the signal from the main switch 36 is ON, the regulation of the throttle adjusting actuator is always performed to maintain the vehicle speed at the target speed. Thus, there is a problem in that the vehicle operator feels a shock motion due to the execution of the constant-speed running procedure when the vehicle operator releases the accelerator pedal 16 at a relatively high vehicle speed at the end of a high-speed running of the vehicle, in order to decrease the vehicle speed. To avoid the above problem of the second embodiment, the present invention provides a third embodiment of the constant-speed running procedure which follows.

Figure 7:
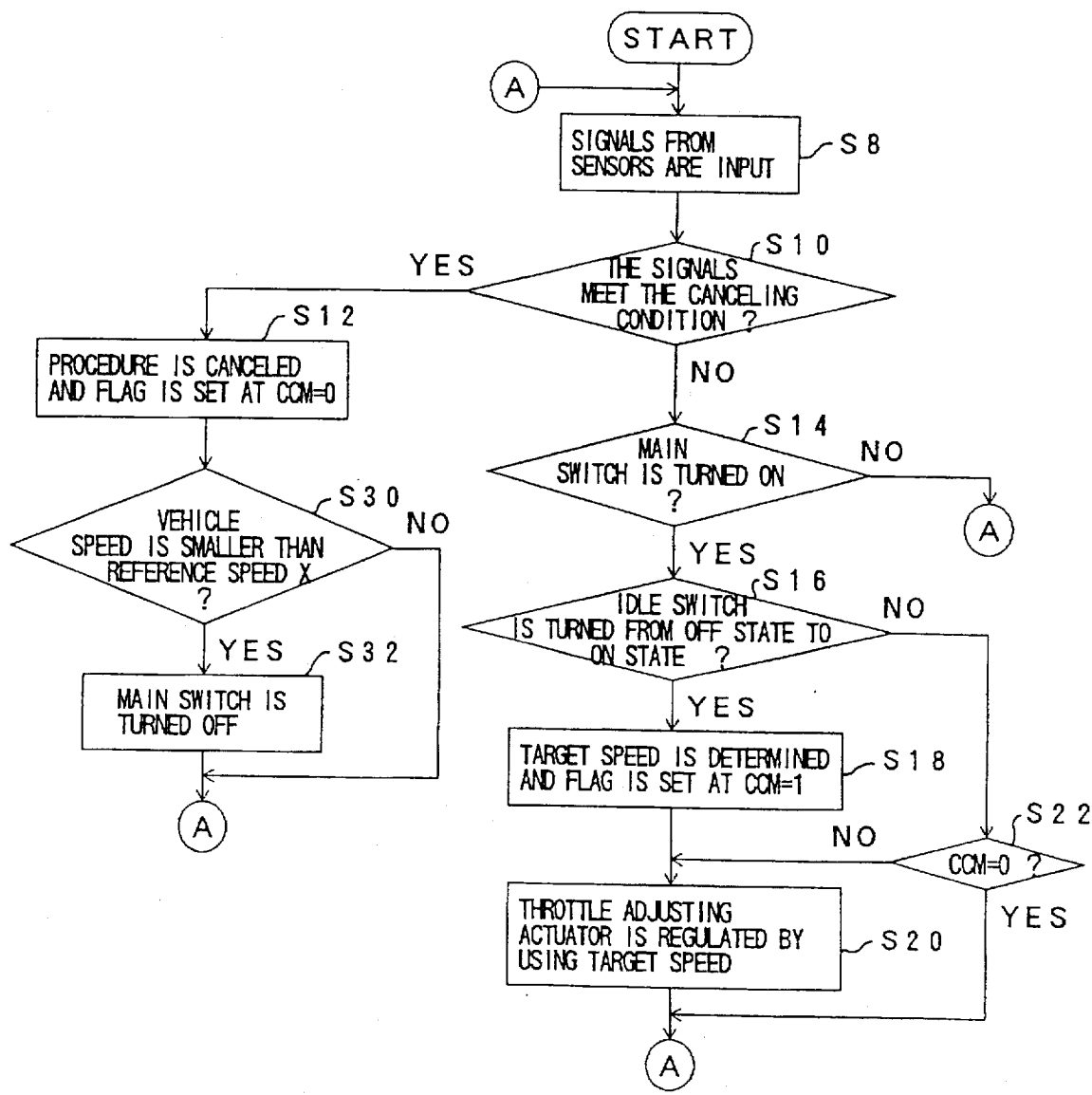
FIG. 7 is a flowchart for explaining a third embodiment of the constant-speed running procedure executed by the ECU.

FIG. 7 shows the third embodiment of the constant-speed running procedure executed by the ECU 30 in FIG. 3. In FIG. 7, the steps S8 through S22 of the present embodiment which are the same as the corresponding steps in FIG. 4 are designated by the same reference numerals, and a description thereof will be omitted.

Referring to FIG. 7, when the result at the step S10 is affirmative (the signals from the sensors meet the canceling condition), the step S12 is performed. As described above, the step S12 cancels performing the constant-speed running procedure in FIG. 7, and sets the control-state flag CCM at zero (CCM=0).

After the step S12 is performed, step S30 is performed. Step S30 detects whether the vehicle speed, indicated by the signal from the vehicle speed sensor 32, is smaller than a predetermined reference speed X. The reference speed X is, for example, 40 km/h.

When the vehicle speed is detected at the step S30 to be smaller than the reference speed X, step S32 is performed. Step S32 forcefully turns the main switch 36 to the OFF state. After the step S32 is performed, the procedure will be transferred to the step S8 at the start of the following cycle, as indicated by the character A in FIG. 7.

When the vehicle speed is detected at the step S30 not to be smaller than the reference speed X, the step S32 is not performed, and the procedure will be transferred to the step S8 at the start of the following cycle.

In the above-described third embodiment, only after the vehicle speed is detected to be smaller than the reference speed X, the main switch 36 is forcefully turned to the OFF state. By detecting the OFF state of the main switch 36, the ECU 30 determines that starting the constant-speed running procedure in FIG. 7 is canceled. Since starting the constant-speed running procedure at this time is avoided, it is possible to prevent the vehicle operator from feeling a shock motion when the vehicle operator releases the accelerator pedal 16 at a relatively high vehicle speed.

It is readily understood that the actuator control unit 44 of the constant speed regulator apparatus of the present invention may include a first canceling unit which corresponds to the ECU 30 performing the steps S30 and S32 in FIG. 7. The first canceling unit cancels the regulation of the throttle adjusting actuator 45 by the actuator control unit 44 by turning the main switch 36 into the OFF state when the vehicle speed detected by the vehicle speed sensor 32 is smaller than the reference speed X.

Figure 8:
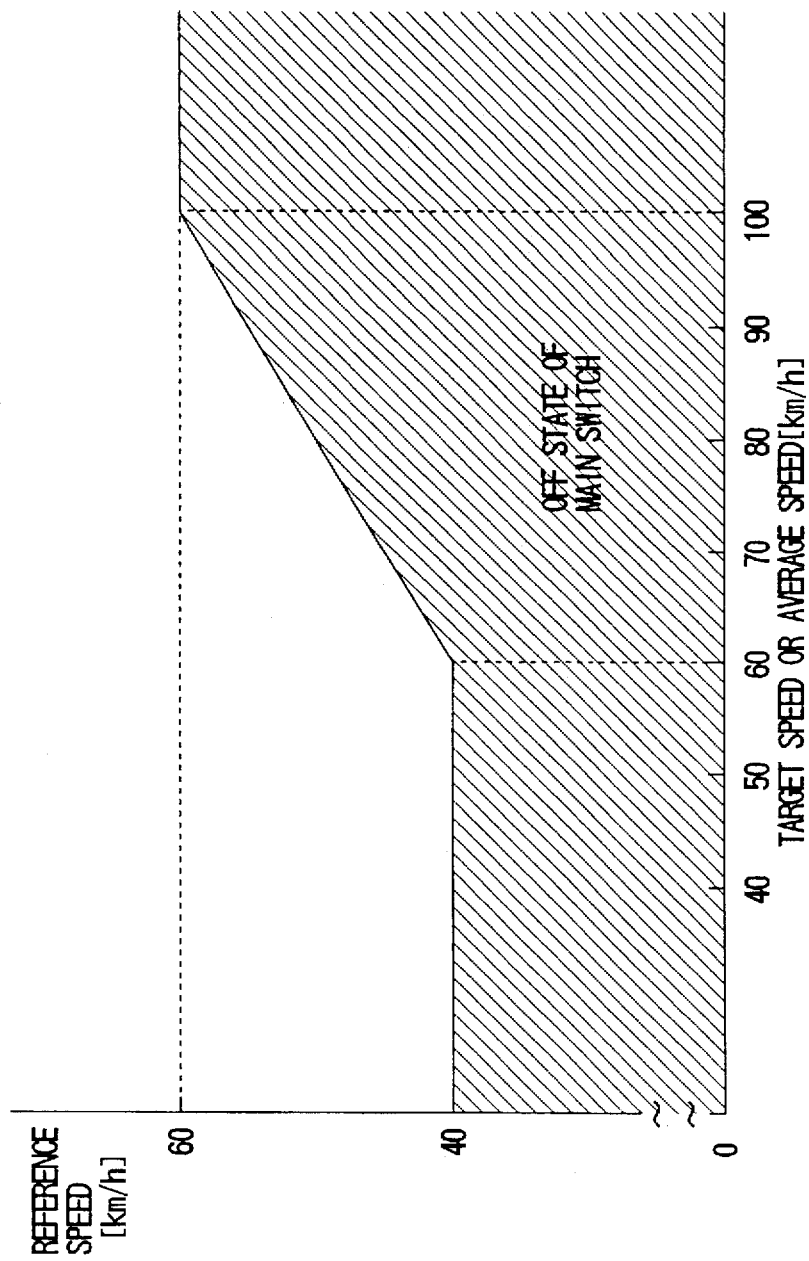
FIG. 8 is a diagram of a map used by the ECU when the constant-speed running procedure in FIG. 7 is executed.

FIG. 8 shows a map used by the ECU 30 when the constant-speed running procedure in FIG. 7 is executed.

As indicated by the shaded area in FIG. 8, the map defines the relationship between the reference speed X and the target speed. Alternatively, the map in FIG. 8 defines the relationship between the reference speed X and the average speed. In the present embodiment, the reference speed X is set at 40 km/h (constant) when the target speed is below 60 km/h (a typical running speed of the vehicle on a highway), and the reference speed X is increasingly changed when the target speed is in the range of 60–100 km/h (a typical running speed of the vehicle at the exit of an expressway), and the reference speed X is set at 60 km/h (constant) when the target speed is above 100 km/h (a typical running speed of the vehicle on an expressway).

In the present embodiment, the reference speed X which is used at the step S30 in FIG. 7 is varied in accordance with the target speed presently determined at the step S18 in FIG. 7, by using the map shown in FIG. 8. For example, when the target speed is in the range of 60–100 km/h (e.g., the vehicle is running at the exit of the expressway), the reference speed X is changed between 40 km/h and 60 km/h by using the map. If the vehicle speed at this time is detected to be smaller than the reference speed X, the main switch 36 is forcefully turned into the OFF state. On the other hand, when the target speed is below 60 km/h (e.g., the vehicle is running on the highway), the reference speed X is set at 40 km/h by using the map. If the vehicle speed at this time is detected to be smaller than the reference speed X, the main switch 36 is forcefully turned into the OFF state. Accordingly, it is possible for the present embodiment to reliably prevent the vehicle operator from feeling a shock motion when the vehicle operator releases the accelerator pedal 16 at a relatively high vehicle speed. Also, the present embodiment can provide the ease of the operation by the vehicle operator.

It is readily understood that the actuator control unit 44 of the present invention may include the above-mentioned first canceling unit and a reference speed control unit. The first canceling unit corresponds to the ECU 30 performing the steps S30 and S32 in FIG. 7. The reference speed control unit varies the reference speed X in accordance with the target speed determined at the step S18 in FIG. 7, by using the map shown in FIG. 8. The first canceling unit cancels the regulation of the throttle adjusting actuator by the actuator control unit 44 based on the reference speed X produced by the reference speed control unit.

Further, it is readily understood that the actuator control unit 44 of the present invention may include the above-mentioned first canceling unit and another reference speed control unit. The first canceling unit corresponds to the ECU 30 performing the steps S30 and S32 in FIG. 7. The reference speed control unit varies the reference speed X in accordance with an average of a number of previous values of the target speed previously determined at the step S18 in FIG. 7, by using the map in FIG. 8. The average speed shown in FIG. 8 corresponds to the average of the previous values of the target speed previously determined at the step S18 in FIG. 7.

Figure 9:
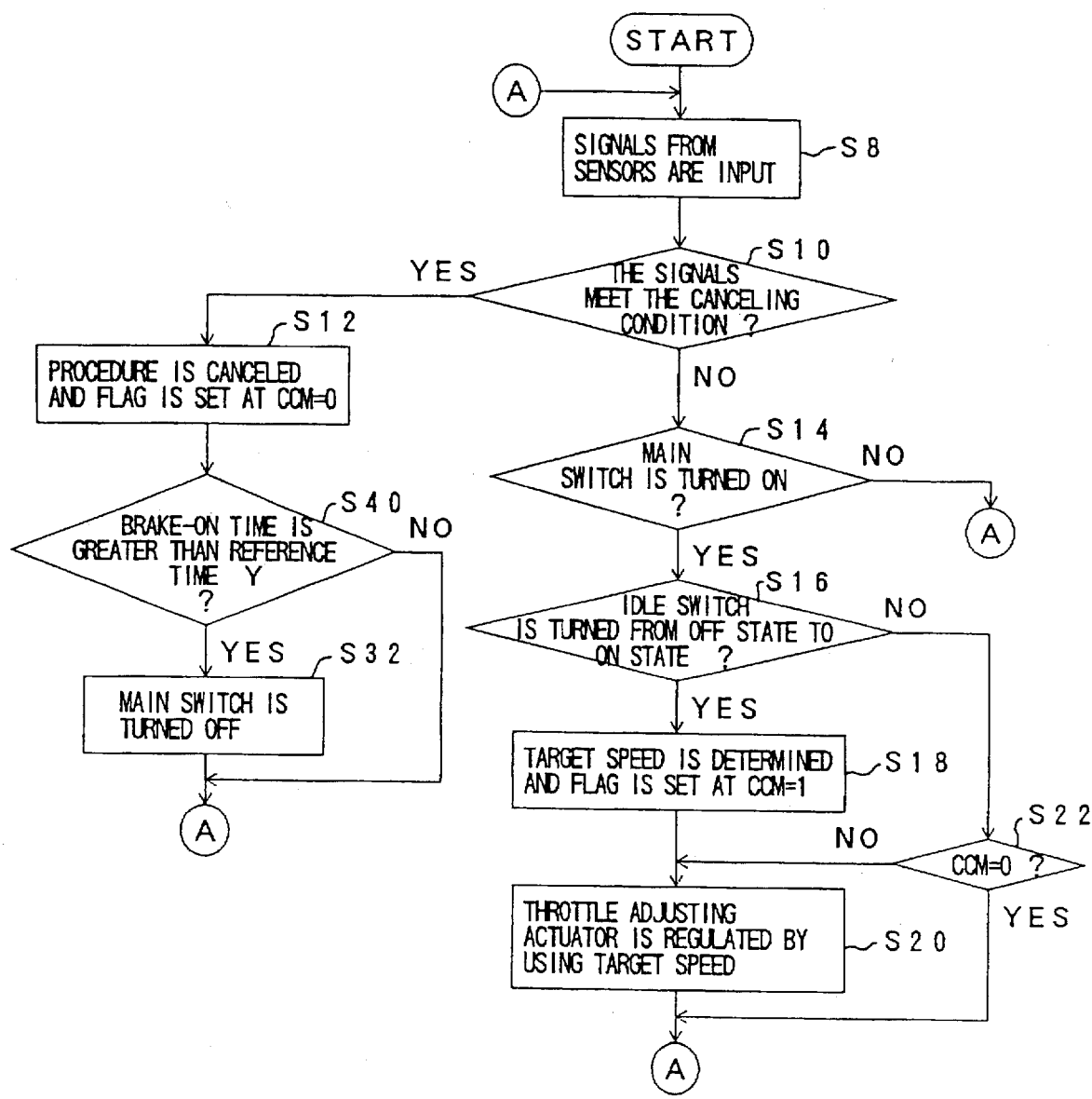
FIG. 9 is a flowchart for explaining a fourth embodiment of the constant-speed running procedure executed by the ECU.

FIG. 9 shows a fourth embodiment of the constant-speed running procedure executed by the ECU 30.

Generally, when a brake-on time the brake pedal is continuously pressed by the vehicle operator is greater than a reference time, either the case in which the vehicle is running on a downhill road, or the case in which an obstruct in front of the running vehicle is found can be considered. If the constant-speed running procedure is performed in such cases, the vehicle operator may feel a shock motion when the brake pedal is pressed. In the fourth embodiment, when the brake-on time is greater than the reference time, the main switch 36 is turned into the OFF state so as to prevent the constant-speed running procedure from being executed by the ECU 30 in the above cases.

In FIG. 9, the steps S8 through S22 of the present embodiment which are the same as the corresponding steps in FIG. 4 are designated by the same reference numerals, and a description thereof will be omitted.

Referring to FIG. 9, when the result at the step S10 is affirmative (the signals from the sensors meet the canceling condition), the step S12 is performed. As described above, the step S12 cancels performing the constant-speed running procedure in FIG. 9, and sets the control-state flag CCM at zero (CCM=0).

After the step S12 is performed, step S40 is performed. Step S40 detects whether the brake-on time the brake pedal is continuously pressed by the vehicle operator, derived from the signal from the brake sensor 34, is greater than a predetermined reference time Y. The reference time Y is, for example, 4 seconds.

When the brake-on time is detected at the step S40 to be greater than the reference time Y, the step S32 is performed. As described above, the step S32 forcefully turns the main switch 36 into the OFF state. After the step S32 is performed, the procedure will be transferred to the step S8 at the start of the following cycle, as indicated by the character A in FIG. 9.

When the brake-on time is detected at the step S40 not to be greater than the reference time Y, the step S32 is not performed, and the procedure will be transferred to the step S8 at the start of the following cycle, as indicated by the character A in FIG. 9.

In the above-described fourth embodiment, only after the brake-on time is detected to be greater than the reference time Y, the main switch 36 is forcefully turned into the OFF state. By detecting the OFF state of the main switch 36, the ECU 30 determines that starting the constant-speed running procedure in FIG. 9 is canceled. Since starting the constant-speed running procedure at this time is avoided, it is possible to prevent the vehicle operator from feeling a shock motion when the vehicle operator presses down the brake pedal.

It is readily understood that the actuator control unit 44 of the present invention may include a brake-on time detecting unit and a second canceling unit. The brake-on time detecting unit corresponds to the ECU 30 detecting a brake-on time the brake pedal is continuously pressed by the vehicle operator. The second canceling unit corresponds to the ECU 30 performing the steps S40 and S32 in FIG. 9. The second canceling unit cancels the regulation of the throttle adjusting actuator 45 by the actuator control unit 44 by forcefully turning the main switch 36 into the OFF state when the brake-on time is greater than the reference time Y.

FIG. 10 shows a map used by the ECU 30 when the constant-speed running procedure in FIG. 9 is executed.

As indicated by the shaded area in FIG. 10, the map defines the relationship between the reference time and the target speed. Alternatively, the map in FIG. 10 defines the relationship between the reference deceleration and the average speed.

In the present embodiment, the reference time Y is set at 4 seconds (constant) when the target speed is below 60 km/h, and the reference time Y is increasingly changed when the target speed is in the range of 60–100 km/h, and the reference time Y is set at 10 seconds (constant) when the target speed is above 100 km/h.

In the present embodiment, the reference time Y which is used at the step S40 in FIG. 9 is varied in accordance with the target speed presently determined at the step S18 in FIG. 9, by using the map shown in FIG. 10. For example, when the target speed is in the range of 60–100 km/h (e.g., the vehicle is running at the exit of the expressway), the reference time Y is changed between 4 sec. and 10 sec. by using the map shown in FIG. 10. If the brake-on time at this time is detected to be greater than the reference time Y, the main switch 36 is forcefully turned into the OFF state. On the other hand, when the target speed is below 60 km/h (e.g., the vehicle is running on the highway), the reference time Y is set at 4 sec by using the map. If the brake-on time at this time is detected to be greater than the reference time Y, the main switch 36 is forcefully turned into the OFF state. Accordingly, it is possible for the present embodiment to prevent the vehicle operator from feeling a shock motion when the vehicle operator continuously presses down the brake pedal. Also, the present embodiment can provide the ease of the operation by the vehicle operator.

It is readily understood that the actuator control unit 44 of the present invention may include the above-mentioned second canceling unit and a reference time control unit. The reference time control unit corresponds to the ECU 30 which varies the reference time Y in accordance with the target speed determined at the step S18 in FIG. 9, by using the map shown in FIG. 10. The second canceling unit cancels the regulation of the throttle adjusting actuator by the actuator control unit 44 based on the reference time Y produced by the reference time control unit.

FIG. 11 shows a fifth embodiment of the constant-speed running procedure executed by the ECU 30.

Generally when the brake-on time is greater than the reference time, a deceleration of the vehicle speed, derived from the signal from the vehicle speed sensor 32, is greater than a reference deceleration. If the constant-speed running procedure is performed in such a case, the vehicle operator may feel a shock motion when the brake pedal is pressed. In the fifth embodiment, when the deceleration of the vehicle speed is greater than the reference deceleration, the main switch 36 is forcefully turned into the OFF state so as to prevent the constant-speed running procedure from being executed by the ECU 30 in the above cases.

In FIG. 11, the steps S8 through S22 of the present embodiment which are the same as the corresponding steps in FIG. 4 are designated by the same reference numerals, and a description thereof will be omitted.

Referring to FIG. 11, when the result at the step S10 is affirmative (the signals from the sensors meet the canceling condition), the step S12 is performed. As described above, the step S12 cancels performing the constant-speed running procedure in FIG. 9, and sets the control-state flag CCM at zero (CCM=0).

After the step S12 is performed, step S45 is performed. Step S45 detects whether the deceleration of the vehicle speed, derived from the signal from the vehicle speed sensor 32 (or derived by using an acceleration sensor), is greater than a predetermined reference deceleration Z. The reference deceleration Z is, for example, 0.3 G.

When the deceleration of the vehicle speed is detected at the step S45 to be greater than the reference deceleration Z, the step S32 is performed. As described above, the step S32 forcefully turns the main switch 36 into the OFF state. After the step S32 is performed, the procedure will be transferred to the step S8 at the start of the following cycle, as indicated by the character A in FIG. 9.

When the deceleration of the vehicle speed is detected at the step S45 not to be greater than the reference deceleration Z, the step S32 is not performed, and the procedure will be transferred to the step S8 at the start of the following cycle, as indicated by the character A in FIG. 9.

In the above-described fifth embodiment, only after the deceleration of the vehicle speed is detected to be greater than the reference deceleration Z, the main switch 36 is forcefully turned into the OFF state. By detecting the OFF state of the main switch 36, the ECU 30 determines that starting the constant-speed running procedure in FIG. 11 is canceled. Since starting the constant-speed running procedure at this time is avoided, it is possible to prevent the vehicle operator from feeling a shock motion when the vehicle operator presses down the brake pedal.

It is readily understood that the actuator control unit 44 of the present invention may include a deceleration sensing unit and a third canceling unit. The deceleration sensing unit corresponds to the ECU 30 detecting the deceleration of the vehicle speed. The third canceling unit corresponds to the ECU 30 performing the steps S45 and S32 in FIG. 11. The third canceling unit cancels the regulation of the throttle adjusting actuator 45 by the actuator control unit 44 by forcefully turning the main switch 36 into the OFF state when the deceleration detected by the deceleration sensing unit is greater than the reference deceleration Z.

Figure 12:
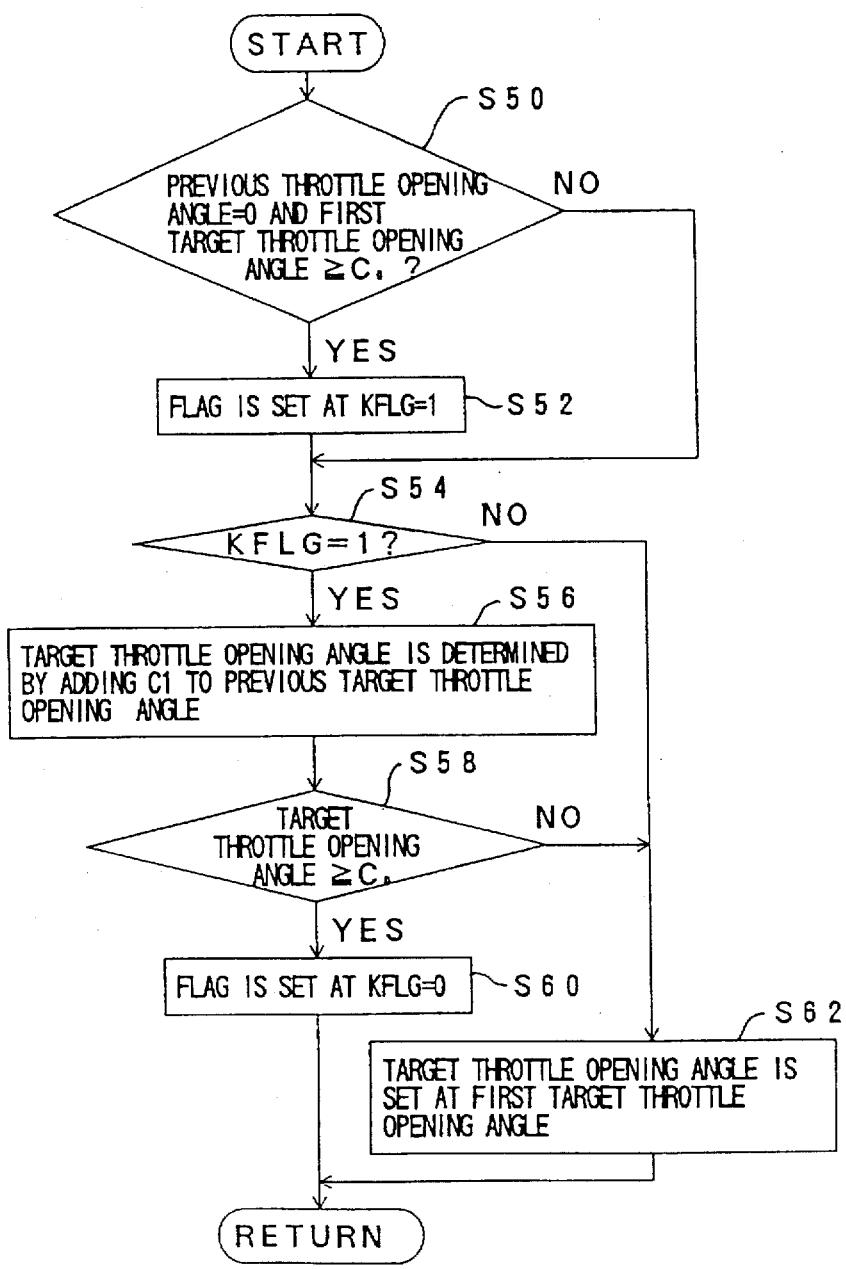
FIG. 12 is a flowchart for explaining a throttle adjusting actuator regulation routine which is performed in one of the above-mentioned constant-speed running procedures.

FIG. 12 shows a throttle adjusting actuator regulation routine which is performed in one of the constant-speed running procedures described above with reference to FIG. 4, FIG. 6, FIG. 7, FIG. 9 and FIG. 11. In the present embodiment, the throttle adjusting actuator regulation routine in FIG. 12 is performed instead of the step S20 shown in FIG. 4, FIG. 6, FIG. 7, FIG. 9 and FIG. 11.

Referring to FIG. 12, step S50 detects whether a previous throttle opening angle of the throttle valve 12, previously indicated by the signal from the throttle sensor 20, is equal to zero, and detects whether a first target throttle opening angle, calculated from the target speed determined at the step S18, is greater than a reference angle Co. In the present embodiment, the reference angle Co is, for example, 2 degrees.

When the result at the step S50 is affirmative (the signals meet the conditions of the step S50), the running speed of the vehicle is changed from the deceleration state to the acceleration state and the vehicle operator may feel a shock motion. To avoid this problem, it is necessary to perform a shock reduction. Step S52 sets a shock reduction flag KFLG at one (KFLG=0), which indicates that performing the shock reduction is to be started. After the step S52 is performed, step S54 is performed.

When the result at the step S50 is negative, the step S52 is not performed and the step S54 is performed. Step S54 detects whether the shock reduction flag KFLG is equal to one.

When the result at the step S54 is affirmative (KFLG=1), step S56 is performed. Step S56 determines the target throttle opening angle by adding a constant C1 (for example, C1=0.1 deg.) to a previous target throttle opening angle. That is, the throttle opening angle of the throttle valve 12 is gradually increased by the constant C1 when the target throttle opening angle is below the reference angle Co.

After the step S56 is performed, step S58 detects whether the target throttle opening angle determined at the step S56 is greater than the reference angle Co.

When the determined target throttle opening angle is detected to be greater than the reference angle Co, step S60 is performed. Step S60 sets the shock reduction flag KFLG at zero (KFLG=0), which indicates that performing the shock reduction is to be stopped.

When the result at the step S54 is negative (KFLG=0), or when the result at the step S58 is negative (the target throttle opening angle<Co), step S62 is performed. Step S62 sets the target throttle opening angle at the first target throttle opening angle which is calculated from the target speed.

A control signal, indicating the target throttle opening angle determined by the above routine, is output by the ECU 30 to the throttle adjusting actuator 18 so that the throttle opening angle of the throttle valve 12 is regulated.

In the present embodiment, when the throttle opening angle of the throttle valve 12 is changed from zero to a certain throttle opening angle, the shock reduction is performed. That is, the throttle opening angle of the throttle valve 12 is gradually increased by the constant C1 when the target throttle opening angle is below the reference angle Co, and when the target throttle opening angle is above the reference angle Co, the procedure is returned to the normal throttle adjusting actuator regulation.

In the present embodiment, when the vehicle operator presses down the accelerator pedal 16 and then slowly releases the accelerator pedal 16, the throttle valve 12 starts opening by the function of the throttle adjusting actuator 18. If the vehicle operator completely releases the accelerator pedal 16, the idle switch 22 cannot be turned into the ON state. It is impossible to set the present target speed at a vehicle speed that is smaller than the previously determined target speed. To avoid this problem, the following embodiment is provided.

Figure 13:
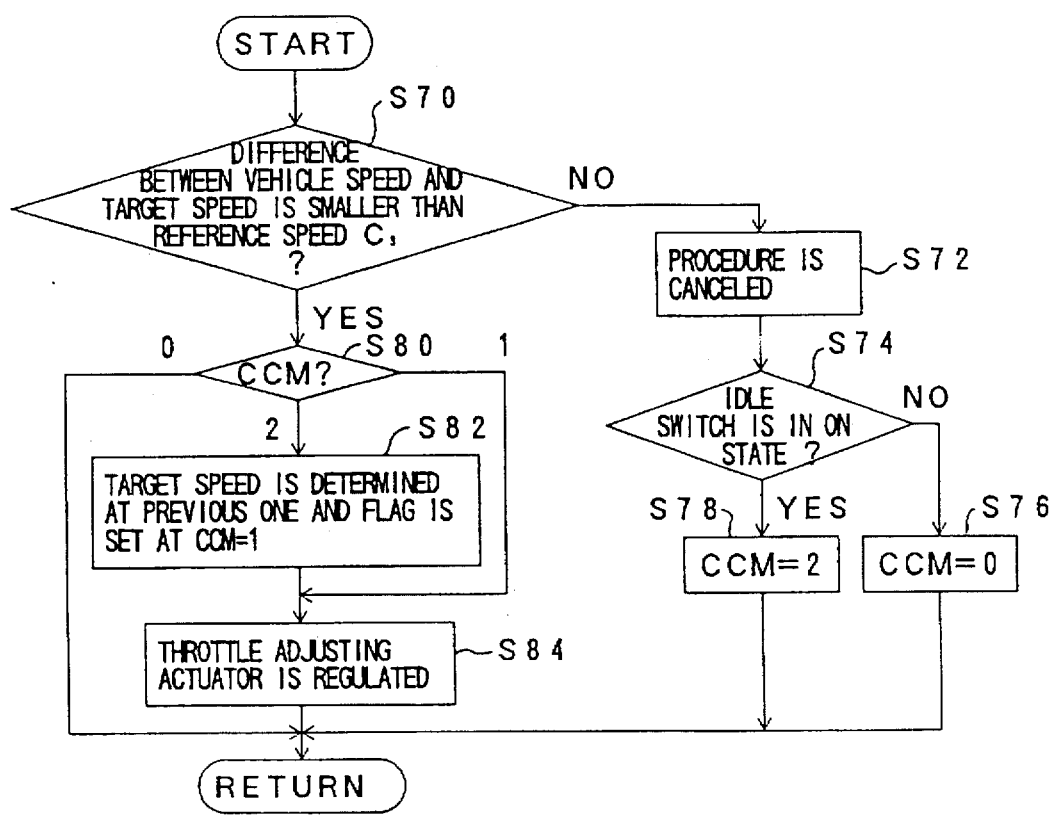
FIG. 13 is a flowchart for explaining another throttle adjusting actuator regulation routine which is performed in one of the above-mentioned constant-speed running procedures.

FIG. 13 shows another throttle adjusting actuator regulation routine which is performed in one of the constant-speed running procedures described above with reference to FIG. 4, FIG. 6, FIG. 7, FIG. 9 and FIG. 11. In the present embodiment, the throttle adjusting actuator regulation routine in FIG. 13 is performed instead of the step S20 shown in FIG. 4, FIG. 6, FIG. 7, FIG. 9 and FIG. 11.

Referring to FIG. 13, step S70 detects whether a difference between the vehicle speed (indicated by the signal from the vehicle speed sensor 32) and the target speed (determined at the step S18) is smaller than a predetermined reference speed C3. In the present embodiment, the reference speed C3 is 10 km/h.

When the difference between the vehicle speed and the target speed is greater than the reference speed C3, step S72 is performed. Step S72 cancels performing the constant-speed running procedure. Step S74 detects whether the idle switch 22 is in the ON state.

It is readily understood that the actuator control unit 44 of the present invention includes a fourth canceling unit canceling the regulation of the throttle adjusting actuator by the actuator control unit 44 when a difference between the vehicle speed detected by the vehicle speed sensing unit 41 and the target speed determined by the target speed determining unit 43 is above the reference speed C3. The fourth canceling unit corresponds to the ECU 30 performing the steps S70 and S72 in FIG. 13.

When the idle switch 22 is detected to be in the OFF state, step S76 sets the control-state flag CCM at zero (CCM=0), which indicates that performing the constant-speed running procedure is stopped.

If the vehicle operator releases the accelerator pedal 16 after the constant-speed running procedure is canceled at the step S72, the idle switch 22 is turned into the ON state. The procedure will be transferred from the step S16 to the step S18, as shown in FIG. 4, so that the target speed is determined. Accordingly, in the present embodiment, it is possible to set the target speed at a vehicle speed that is smaller than the previously determined target speed.

If the constant-speed running procedure is performed when the vehicle is running on a steep downhill road, the vehicle speed is gradually increased and the throttle adjusting actuator 18 is used to decrease the throttle opening angle of the throttle valve 12. Since the throttle opening angle of the throttle valve 12 is changed to zero, the idle switch 22 is turned into the ON state at that time. There is a problem that the target speed is determined at that time by the vehicle speed which is increased due to the running on the steep downhill road. The present embodiment shown in FIG. 13 is provided to avoid this problem.

Referring back to FIG. 13, when the result at the step S70 is negative, the step S72 cancels performing the constant-speed running procedure. After then, if the idle switch 22 is turned into the ON state, it is determined that the vehicle speed has been increased due to the running on the steep downhill road. Thus, when the idle switch 22 is detected at the step S74 to be in the ON state, step S78 sets the control-state flag CCM at two (CCM=2), which indicates that the constant-speed running procedure is in a waiting state or it is suspended.

When the result at the step S70 at the following cycle is affirmative, the difference between the vehicle speed and the target speed is below the reference speed C3. At this time, step S80 is performed. Step S80 detects whether the control-state flag CCM is equal to 2. When the CCM is equal to 2, step S82 is performed. Step S82 determines again the target speed by using the previous target speed which is previously determined before the cancellation at the step S72. Also, step S82 sets the control-state flag CCM at one (CCM=1). After the step S82 is performed, step S84 is performed.

When the CCM is detected at the step S80 to be equal to 1, the step S82 is not performed and step S84 is performed. Step S84 performs the regulation of the throttle adjusting actuator 18 which is the same as the step S20 in FIG. 4. When the CCM is detected at the step S80 to be equal to 0, neither the step S82 nor the step S84 is performed.

In the present embodiment, it is possible to prevent the target speed from being increased if the constant-speed running procedure is performed when the vehicle is running on the steep downhill road.

It is readily understood that the target speed determining unit 43 of the present invention includes a first inhibiting unit inhibiting determination of the target speed by the target speed determining unit 31 when the OFF state of the throttle valve is detected after the regulation of the throttle adjusting actuator 45 by the actuator control unit 44 is canceled by the fourth canceling unit. The first inhibiting unit corresponds to the ECU 30 performing the steps S72, S74, S78, S80 and S82 in FIG. 13.

Further, the following embodiments prevent the target speed from being increased if the constant-speed running procedure is performed when the vehicle is running on a steep downhill road.

Figure 14:
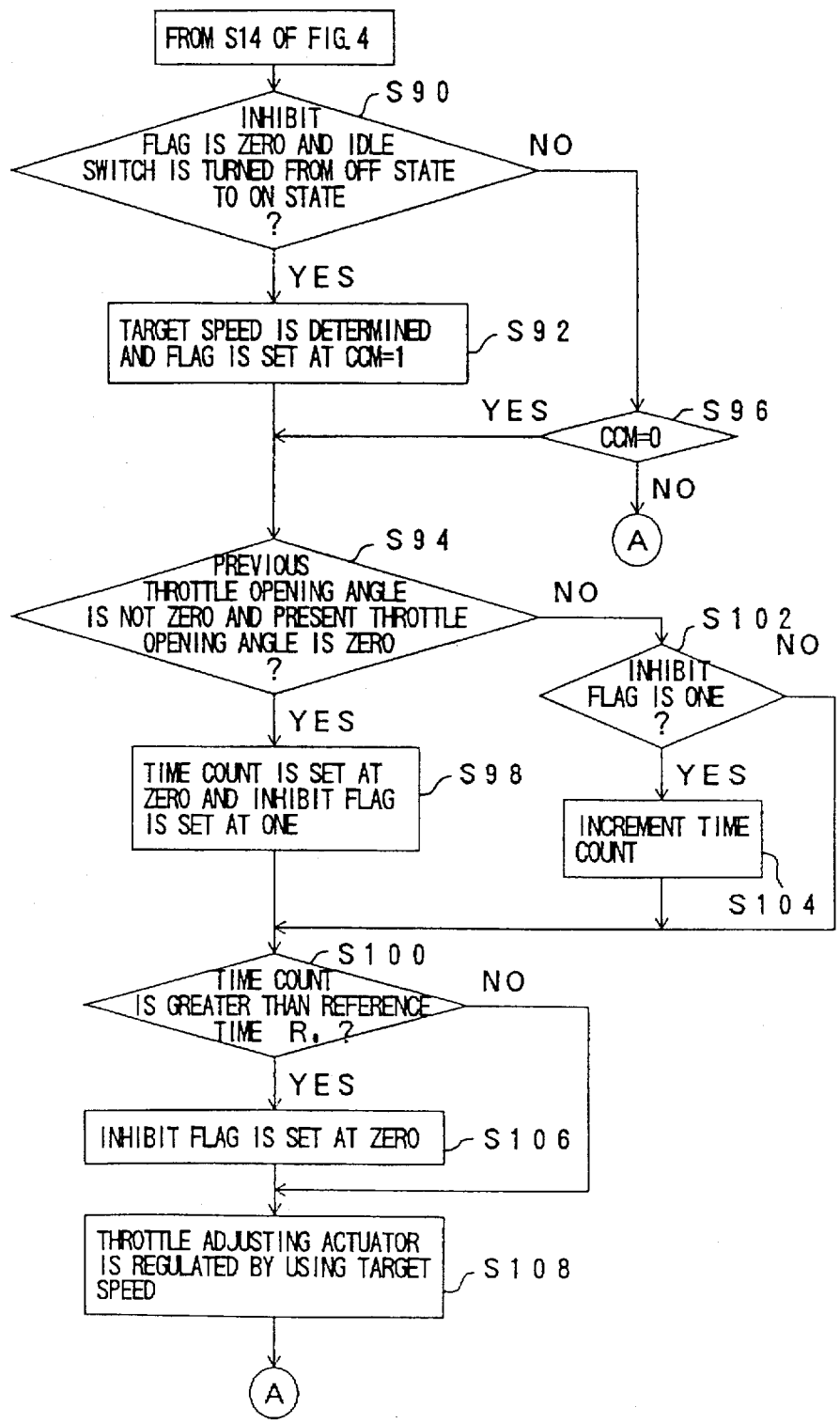
FIG. 14 is a flowchart for explaining still another throttle adjusting actuator regulation routine of the constant-speed running procedure in FIG. 4.

FIG. 14 shows a further throttle adjusting actuator regulation routine which is performed instead of the steps S16 through S22 of the constant-speed running procedure in FIG. 4.

Referring to FIG. 14, step S90 is performed when the result at the step S14 in FIG. 4 is affirmative (the main switch 36 is turned ON). Step S90 detects whether an inhibit flag is equal to zero and the idle switch 22 is turned from the OFF state into the ON state. When the inhibit flag is equal to zero (or the inhibit flag is in the OFF state), it enables the detection of the ON/OFF state of the idle switch 22 to be done. When the inhibit flag is equal to one (or the inhibit flag is in the ON state), it inhibits the detection of the ON/OFF state of the idle switch 22 from being done.

When the result at the step S90 is affirmative (the signals meet such conditions), step S92 is performed. Step S92 determines a target speed by using the vehicle speed indicated by the signal presently output from the vehicle speed sensor 32. In addition, step S92 sets the control-state flag CCM at one (CCM=1), which indicates that the constant-speed running procedure is to be performed. After the step S92 is performed, step S94 is performed.

When the result at the step S90 is negative (the signals do not meet the conditions), step S96 is performed. Step S96 detects whether the control-state flag CCM is equal to zero. When the CCM is equal to zero, step S94 is performed. When the CCM is not equal to zero, the procedure is transferred to the step S8 in FIG. 4, as indicated by the character A in FIG. 14.

Step S94 detects whether the previous throttle opening angle of the throttle valve 12, indicated by the signal previously output from the throttle sensor 20, is not equal to zero, and the present throttle opening angle, indicated by the signal presently output from the throttle sensor 20, is equal to zero. The conditions at the step S94 are used to set a time count at zero and start incrementing the time count.

When the result at the step S94 is affirmative (the signals meet the conditions), step S98 is performed. Step S98 sets the time count at zero, and sets the inhibit flag at one, which indicates that the detection of the ON/OFF state of the idle switch 22 is to be inhibited. After the step S98 is performed, step S100 is performed.

When the result at the step S94 is negative (the signals do not meet the conditions), step S102 is performed. Step S102 detects whether the inhibit flag is equal to one. When the inhibit flag is detected to be equal to one (the ON state), step S104 increments the time count. After the step S104 is performed, step S100 is performed. When the inhibit flag is detected to be equal to zero (the OFF state), step S100 is performed and the step S104 is not performed.

Step S100 detects whether the time count is greater than a predetermined reference time Ro. In the present embodiment, the reference time Ro is 500 milli-seconds.

When the result at the step S100 is affirmative (the time count>Ro), step S106 is performed. Step S106 sets the inhibit flag at zero. After the step S106 is performed, step S108 is performed.

When the result at the step S100 is negative (the time count≦Ro), step S106 is not performed and step S108 is performed.

Step S108 regulates the throttle adjusting actuator 18 by using the target speed determined at the step S92, so that the vehicle speed is maintained at the target speed. The step S108 in FIG. 14 is similar to the step S20 in FIG. 4. After the step S108 is performed, the procedure is transferred to the step S8 in FIG. 4 at the start of the following cycle, as indicated by the character A in FIG. 14.

In the present embodiment, the determination of the target speed performed immediately after the detection of the OFF state of the throttle valve 12 is inhibited by using the inhibit flag until the reference time Ro has elapsed since the detection of the OFF state of the throttle valve 12. If the idle switch 22 is turned from the OFF state into the ON state, the OFF state of the throttle valve 12 is ignored when the reference time Ro has not yet elapsed. Accordingly, it is possible for the present embodiment to prevent the target speed from being increased if the constant-speed running procedure is performed when the vehicle is running on the steep downhill road.

It is readily understood that the target speed determining unit 43 of the present invention includes a second inhibiting unit inhibiting determination of the target speed by the target speed determining unit 43 during a predetermined period after the OFF state of the throttle valve is detected by the idle switch unit 42 when a constant speed running procedure is performed. The second inhibiting unit corresponds to the ECU 30 performing the step S90 and the steps S94 through S106 in FIG. 14.

Figure 15:
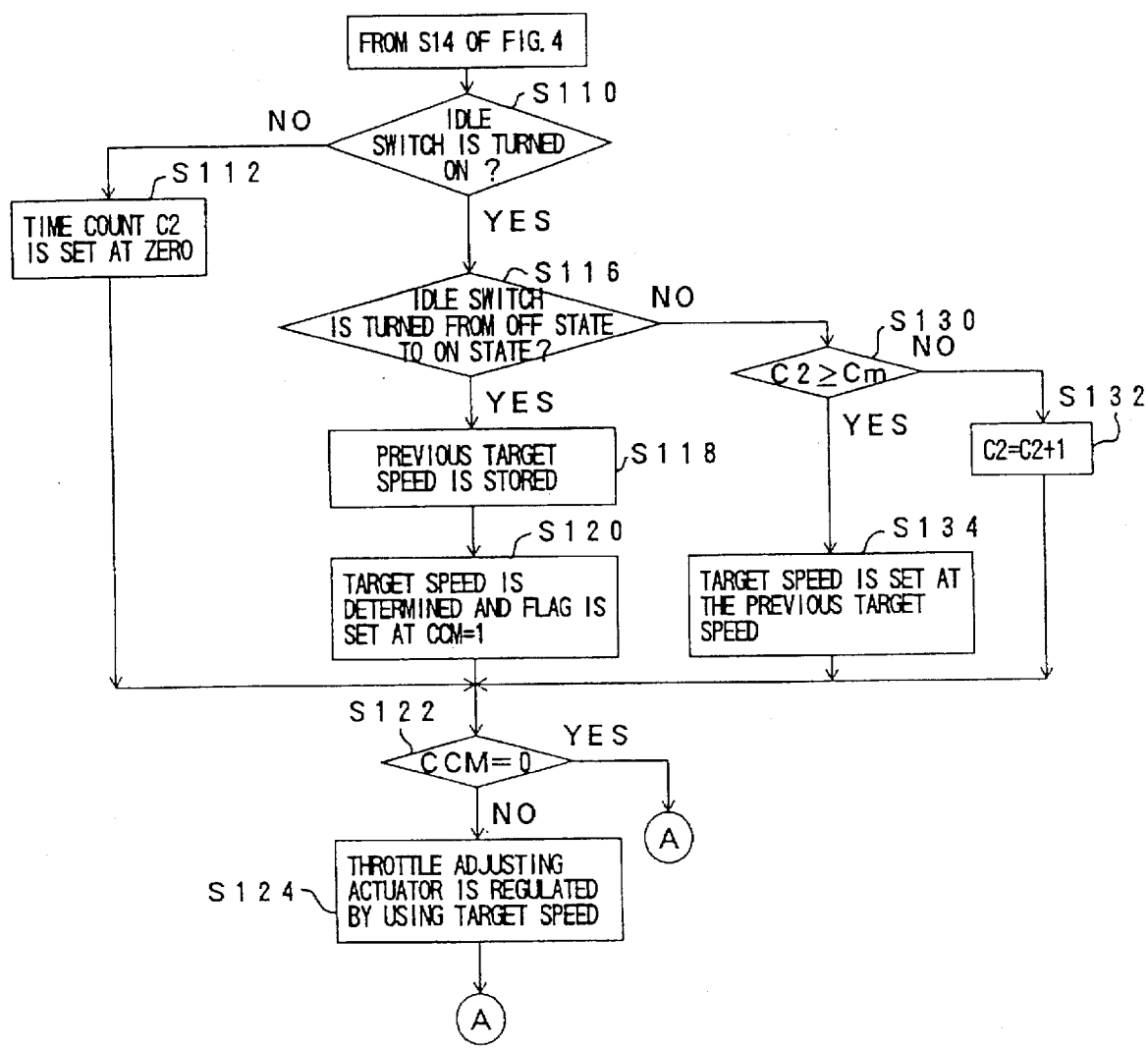
FIG. 15 is a flowchart for explaining a further throttle adjusting actuator regulation routine of the constant-speed running procedure in FIG. 4.

FIG. 15 shows a further throttle adjusting actuator regulation routine which is performed instead of the steps S16 through S22 of the constant-speed running procedure in FIG. 4.

Referring to FIG. 15, step S110 is performed when the result at the step S14 in FIG. 4 is affirmative (the main switch 36 is turned ON). Step S110 detects whether the idle switch 22 is turned in the ON state.

When the result at the step S110 is negative (the idle switch 22 is turned in the OFF state), step S112 is performed. Step S112 sets a time count C2 at zero (C2=0). After the step S112 is performed, step S122 is performed.

When the result at the step S110 is affirmative (the idle switch 22 is turned in the ON state), step S116 is performed. Step S116 detects whether the idle switch 22 is turned from the OFF state at the previous cycle into the ON state at the present cycle. The step S116 in FIG. 15 is similar to the step S16 in FIG. 4.

When the result at the step S116 is affirmative, step S118 is performed. Step S118 stores a previous value of the target speed, previously determined at the previous cycle, in a memory of the ECU 30. Step S120 determines a present value of the target speed by using the vehicle speed indicated by the signal presently output from the vehicle speed sensor 32, and sets the control-state flag CCM at one (CCM=1), which indicates that the constant-speed running procedure is to be performed. After the step S120 is performed, step S122 is performed.

Step S122 detects whether the control-state flag CCM is equal to zero. When the flag CCM is equal to zero, the procedure is transferred to the step S8 in FIG. 4 at the start of the following cycle, as indicated by the character A in FIG. 15. When the flag CCM is equal to one, step S124 is performed. Step S124 regulates the throttle adjusting actuator 18 by using the target speed determined at the step S120, so that the vehicle speed is maintained at the target speed. The step S124 in FIG. 15 is similar to the step S20 in FIG. 4. After the step S124 is performed, the procedure is transferred to the step S8 in FIG. 4 at the start of the following cycle, as indicated by the character A in FIG. 15.

When the result at the step 116 is negative (the idle switch 22 is not turned from the OFF state to the ON state), step S130 is performed. At this time, it is detected that the idle switch 22 is continuously in the ON state at the previous cycle and at the present cycle. Step S130 detects whether the time count C2 is above a predetermined reference time Cm.

When the result at the step S130 is negative (C2<Cm), step S132 is performed. Step S132 increments the time count C2 (C2=C2+1). After the step S132 is performed, the step S122 is performed. When the result at the step S130 is affirmative (C2≧Cm), step S134 is performed. Step S134 sets the present value of the target speed at the previous value of the target speed, stored at the step S118. After the step S134 is performed, the step S122 is performed.

In the present embodiment, the determination of the target speed using the vehicle speed, detected immediately after the OFF state of the throttle valve is detected, is canceled if the time count C2 is greater than the reference time Cm. The target speed is set at the previous value of the target speed previously determined by using the vehicle speed detected before the OFF state of the throttle valve is detected.

Accordingly, it is possible for the present embodiment to prevent the target speed from being increased if the constant-speed running procedure is performed when the vehicle is running on the steep downhill road.

It is readily understood that the target speed determining unit 43 of the present invention includes a target speed setting unit setting a present value of the target speed at a previous value of the target speed, previously determined by the target speed determining unit 43, if a time the OFF state of the throttle valve 12 is continuously detected when a constant speed running procedure is performed is above the reference time Cm. The target speed setting unit corresponds to the ECU 30 performing the steps S110, S112, S118, S130, S132 and S134 in FIG. 15.

Further, the following embodiments also prevent the target speed from being increased if the constant-speed running procedure is performed when the vehicle is running on the steep downhill road.

Figure 16:
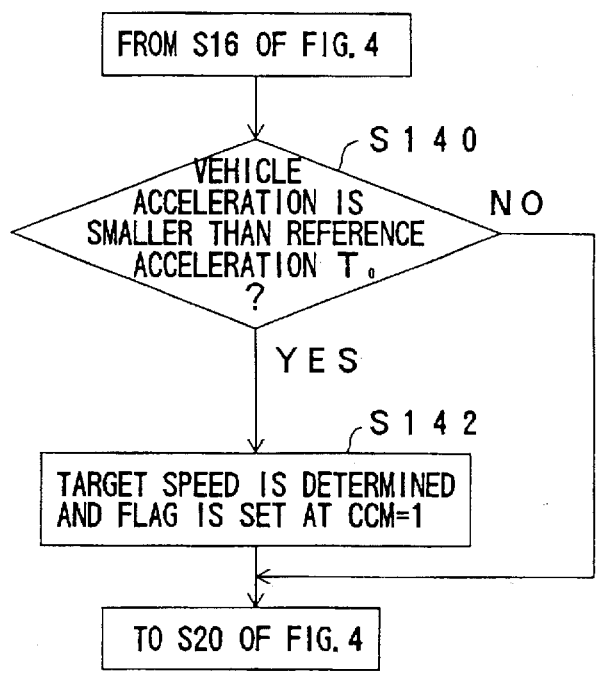
FIG. 16 is a flowchart for explaining another target speed determination routine of the constant-speed running procedure in FIG. 4.
Figure 17:
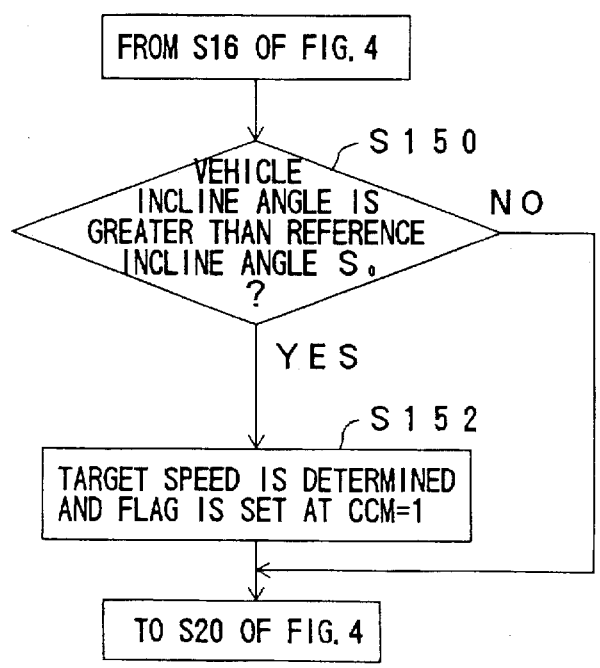
FIG. 17 is a flowchart for explaining still another target speed determination routine of the constant-speed running procedure in FIG. 4.

FIG. 16 shows another target speed determination routine of the constant-speed running procedure in FIG. 4. FIG. 17 shows still another target speed determination routine of the constant-speed running procedure in FIG. 4. The target speed determination routine in FIG. 16 or FIG. 17 is performed instead of the step S18 in FIG. 4.

Referring to FIG. 16, step S140 is performed when the result at the step S16 in FIG. 4 is affirmative (or, the idle switch 22 is turned from the OFF state to the ON state). Step S140 detects whether a vehicle acceleration, which is calculated from a derivative of the vehicle speed detected by the vehicle speed sensor 32, is smaller than a predetermined reference acceleration To. In the present embodiment, the reference acceleration is 0.05 G.

When the result at the step S140 is affirmative (the vehicle acceleration is below the reference acceleration To), step S142 is performed. Step S142 determines the target speed by using the vehicle speed indicated by the signal presently output from the vehicle speed sensor 32. Also, step S142 sets the control-state flag CCM at one (CCM=1), which indicates that the constant-speed running procedure is to be performed. After the step S142 is performed, the procedure is transferred to the step S20 in FIG. 4.

On the other hand, when the result at the step S140 is negative (the vehicle acceleration is above the reference acceleration To), the step S142 is not performed and the procedure is transferred to the step S20 in FIG. 4. That is, it is determined that the vehicle at this time is running on the steep downhill road. Thus, it is possible to prevent the target speed from being increased in such cases.

It is readily understood that the target speed determining unit 43 of the present invention includes an acceleration sensing unit detecting an acceleration of the vehicle speed, and a third inhibiting unit inhibiting determination of the target speed by the target speed determining unit 43 when the acceleration detected by the acceleration sensing unit is greater than a reference acceleration. The acceleration sensing unit corresponds to the ECU 30 calculating the acceleration from the vehicle speed detected by the vehicle speed sensor 32. The third inhibiting unit corresponds to the ECU 30 performing the steps S140 and S142 in FIG. 16.

Referring to FIG. 17, step S150 is performed when the result at the step S16 in FIG. 4 is affirmative (the idle switch 22 is turned from the OFF state to the ON state). Step S150 detects whether an incline angle of the vehicle, which is detected from a signal from an incline angle sensor (not shown), is greater than a predetermined incline angle So. In the present embodiment, the reference incline angle So is −5%.

When the result at the step S150 is affirmative (the vehicle incline angle is above the reference incline angle So), step S152 is performed. Step S152 determines the target speed by using the vehicle speed indicated by the signal presently output from the vehicle speed sensor 32. Also, step S152 sets the control-state flag CCM at one (CCM=1), which indicates that the constant-speed running procedure is to be performed. After the step S152 is performed, the procedure is transferred to the step S20 in FIG. 4.

On the other hand, when the result at the step S140 is negative (the vehicle incline angle is below the reference incline angle So), the step S152 is not performed and the procedure is transferred to the step S20 in FIG. 4. That is, it is determined that the road on which the vehicle is running at this time is steep. Thus, it is possible to prevent the target speed from being increased due to the running on the steep downhill road.

In the present embodiment, the determination on whether the vehicle is running on the steep downhill road can be reliably performed. However, it is necessary to add the incline angle sensor to the vehicle.

It is readily understood that the target speed determining unit 43 of the present invention includes an incline angle sensing unit detecting an incline angle of the vehicle, and a fourth inhibiting means inhibiting determination of the target speed by the target speed determining unit 43 when the incline angle detected by the incline angle sensing unit is not greater than a reference incline angle. The incline angle sensing unit corresponds to the ECU 30 detecting the incline angle from the signal from the incline angle sensor. The fourth inhibiting unit corresponds to the ECU 30 performing the steps S150 and S152 in FIG. 17.

When the vehicle is in an override running condition, the constant-speed running condition of the vehicle is temporarily changed to an acceleration condition to get ahead of another vehicle. At the end of the acceleration condition of the vehicle, if the vehicle operator releases the accelerator pedal 16 so that the vehicle decelerates, the throttle opening angle of the throttle valve 12 is temporarily set at zero. Since the idle switch 22 is turned into the ON state and then a new target speed is determined, there is a problem that the target speed is excessively increased when the constant-speed running procedure is performed at the end of the override running condition of the vehicle. The following embodiments are provided to avoid the above problem.

Figure 18:
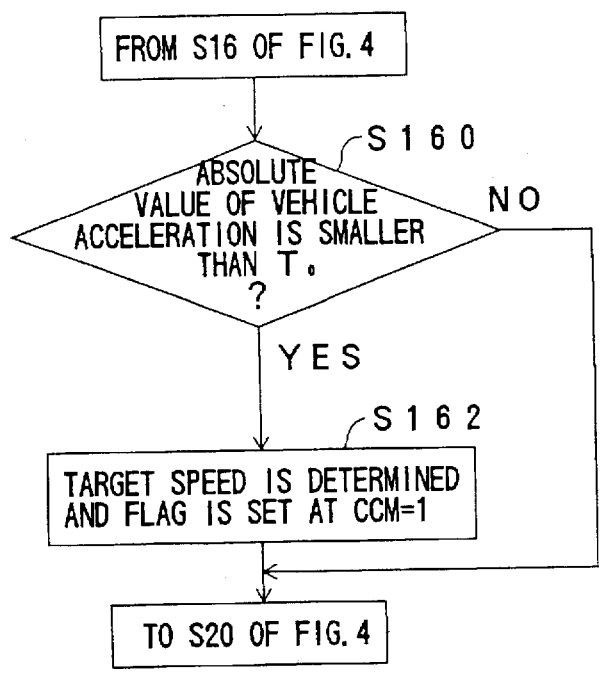
FIG. 18 is a flowchart for explaining a further target speed determination routine of the constant-speed running procedure in FIG. 4.

FIG. 18 shows a further target speed determination routine of the constant-speed running procedure in FIG. 4.

Referring to FIG. 18, step S160 is performed when the result at the step S16 in FIG. 4 is affirmative. Step S160 detects whether the absolute value of a vehicle acceleration, which is calculated from a derivative of the vehicle speed detected by the vehicle speed sensor 32, is smaller than the reference acceleration To. In the present embodiment, the reference acceleration is 0.05 G.

When the result at the step S160 is affirmative (the absolute value of the vehicle acceleration is below the reference acceleration To), step S162 is performed. Step S162 determines the target speed by using the vehicle speed indicated by the signal presently output from the vehicle speed sensor 32. Also, step S162 sets the control-state flag CCM at one (CCM=1), which indicates that the constant-speed running procedure is to be performed. After the step S162 is performed, the procedure is transferred to the step S20 in FIG. 4.

On the other hand, when the result at the step S160 is negative (the absolute value of the vehicle acceleration is above the reference acceleration To), the step S162 is not performed and the procedure is transferred to the step S20 in FIG. 4. That is, it is determined that the vehicle is in the override running condition or running on the steep downhill road. Thus, it is possible to prevent the target speed from being increased in such cases.

Figure 19:
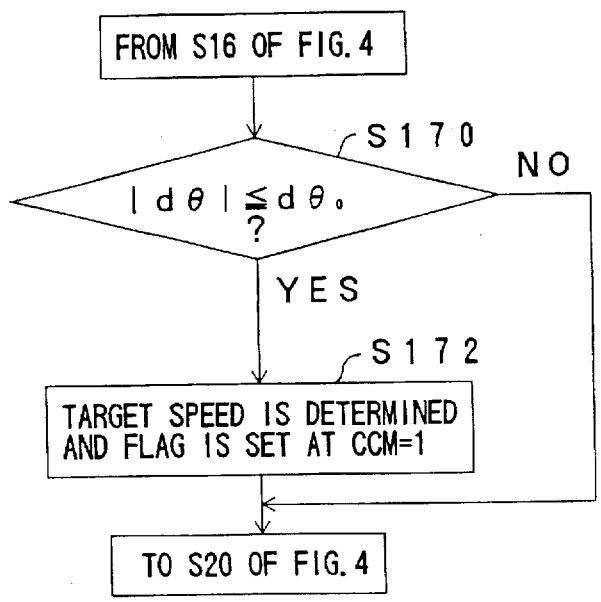
FIG. 19 is a flowchart for explaining another target speed determination routine of the constant-speed running procedure in FIG. 4.

FIG. 19 shows another target speed determination routine of the constant-speed running procedure in FIG. 4.

Referring to FIG. 19, step S170 is performed when the result at the step S16 in FIG. 4 is affirmative. Step S170 detects whether the absolute value $|d\Theta|$ of a changing rate of the throttle opening angle, which is calculated from a derivative of the throttle opening angle of the throttle valve 12 detected by the throttle sensor 20, is smaller than a predetermined reference changing rate $d\Theta o$. In the present embodiment, the reference changing rate $d\Theta o$ is 10%/sec.

When the result at the step S170 is affirmative (the absolute value of the changing rate of the throttle opening angle is below the reference changing rate $d\Theta o$), step S172 is performed. Step S172 determines the target speed by using the vehicle speed indicated by the signal presently output from the vehicle speed sensor 32. Also, step S172 sets the control-state flag CCM at one (CCM=1), which indicates that the constant-speed running procedure is to be performed. After the step S172 is performed, the procedure is transferred to the step S20 in FIG. 4.

On the other hand, when the result at the step S170 is negative (the absolute value of the changing rate of the throttle opening angle is above the reference changing rate $d\Theta o$), the step S172 is not performed and the procedure is transferred to the step S20 in FIG. 4. That is, it is determined that the vehicle is in the override running condition and the accelerator pedal 16 is abruptly released by the vehicle operator. Thus, it is possible to prevent the target speed from being increased in such cases.

It is readily understood that the target speed determining unit 43 of the present invention includes a throttle changing rate sensing unit detecting a changing rate of the throttle opening angle of the throttle valve, and a fifth inhibiting unit inhibiting determination of the target speed by the target speed determining unit 43 when the changing rate detected by the throttle changing rate sensing unit is greater than a reference changing rate. The throttle changing rate sensing unit corresponds to the ECU 30 calculating a changing rate of the throttle opening angle of the throttle valve 12 from a derivative of the throttle opening angle detected by the throttle sensor 20. The fifth inhibiting unit corresponds to the ECU 30 performing the steps S170 and S172 in FIG. 19.

Further, the present invention is not limited to the above-described embodiments, and variations and modifications may be made without departing from the scope of the present invention.

What is claimed is:

1. A constant speed regulator apparatus of an automotive vehicle in which a throttle opening angle of a throttle valve changes in response to a position of an accelerator pedal set by a vehicle operator and in response to an action of a driven throttle adjusting actuator, comprising:

a vehicle speed sensing unit for detecting a vehicle speed of the automotive vehicle;

an idle switch unit for detecting an OFF state of the throttle valve;

a throttle adjusting actuator for adjusting a throttle opening angle of the throttle valve to control the vehicle speed;

a target speed determining unit for determining a target speed by using the vehicle speed which is detected by the vehicle speed sensing unit immediately after the OFF state of the throttle valve is detected by the idle switch unit; and an actuator control unit for controlling the throttle adjusting actuator to set the throttle opening angle of the throttle valve at a controlled level to maintain the vehicle speed at the target speed determined by the target speed determining unit, wherein when the accelerator pedal is pressed to exceed the level of the throttle opening angle controlled by the throttle adjusting actuator during a constant-speed running mode, the actuator control unit controls the throttle adjusting actuator to temporarily decrease the throttle opening angle to zero, and wherein a new target speed is determined based on the vehicle speed detected after the accelerator pedal is released and an OFF state of the throttle valve is detected by the idle switch unit.

2. The apparatus according to claim 1, wherein the actuator control unit comprises:

first canceling means for canceling the regulation of the throttle adjusting actuator by the actuator control unit when the vehicle speed detected by the vehicle speed sensor is smaller than a reference speed.

3. The apparatus according to claim 1, wherein the actuator control unit controls the throttle adjusting actuator such that, when the accelerator pedal is pressed during the constant-speed running mode to a level not exceeding the level of the throttle opening angle controlled by the throttle adjusting actuator so that after release of the accelerator pedal, the OFF state of the throttle valve is not detected, the vehicle speed is maintained at the target speed determined by the target speed determining unit.

4. The apparatus according to claim 1, wherein said actuator control unit comprises:

a brake-on time detecting means detecting a brake-on time during which a brake pedal is continuously pressed by a vehicle operator; and a second canceling means canceling the regulation of the throttle adjusting actuator by said actuator control unit when the brake-on time detected by said brake-on time detecting means is greater than a reference time.

5. The apparatus according to claim 1, wherein said actuator control unit comprises:

a deceleration sensing unit detecting a deceleration of the vehicle speed; and a third canceling means canceling the regulation of the throttle adjusting actuator by said actuator control unit when the deceleration detected by said deceleration sensing unit is greater than a reference deceleration.

6. The apparatus according to claim 1, wherein said actuator control unit comprises:

a delaying means delaying the adjustment of the throttle opening angle of the throttle valve by said throttle adjusting actuator until a target throttle opening angle exceeds a reference angle after the OFF state of the throttle valve is detected by said idle switch unit.

7. The apparatus according to claim 1, wherein said actuator control unit comprises:

a fourth canceling means canceling the regulation of the throttle adjusting actuator by said actuator control unit when a difference between the vehicle speed detected by said vehicle speed sensing unit and said target speed determined by said target speed determining unit is above a reference speed.

8. The apparatus according to claim 1, wherein said target speed determining unit comprises:

a second inhibiting means inhibiting determination of the target speed by said target speed determining unit during a predetermined period after the OFF state of the throttle valve is detected when a constant speed running procedure is performed.

9. The apparatus according to claim 1, wherein said target speed determining unit comprises:

a target speed setting means setting a present value of the target speed at a previous value of the target speed determined by said target speed determining unit if a time during which the OFF state of the throttle valve is continuously detected when a constant speed running procedure is performed is above a reference time.

10. The apparatus according to claim 1, wherein said target speed determining unit comprises:

an acceleration sensing unit detecting an acceleration of the vehicle speed; and a third inhibiting means inhibiting determination of the target speed by said target speed determining unit when the acceleration detected by said acceleration sensing unit is greater than a reference acceleration.

11. The apparatus according to claim 1, wherein said target speed determining unit comprises:

an incline angle sensing unit detecting an incline angle of the vehicle; and a fourth inhibiting means inhibiting determination of the target speed by said target speed determining unit when the incline angle detected by said incline angle sensing unit is not greater than a reference incline angle.

12. The apparatus according to claim 1, wherein said target speed determining unit comprises:

a throttle changing rate sensing unit detecting a changing rate of the throttle opening angle of the throttle valve; and a fifth inhibiting means inhibiting determination of the target speed by said target speed determining unit when the changing rate detected by said throttle changing rate sensing unit is greater than a reference changing rate.

13. The apparatus according to claim 2, wherein the actuator control unit further comprises:

reference speed control means for varying the reference speed in accordance with the target speed determined by the target speed determining unit, the first canceling means canceling the regulation of the throttle adjusting actuator by the actuator control unit based on the reference speed produced by the reference speed control means.

14. The apparatus according to claim 2, wherein the actuator control unit further comprises:

reference speed control means for varying the reference speed in accordance with an average of a number of previous values of the target speed determined by the target speed determining unit, the first canceling means canceling the regulation of the throttle adjusting actuator by the actuator control unit based on the reference speed produced by the reference speed control means.

15. The apparatus according to claim 7, wherein said target speed determining unit comprises:

a first inhibiting means inhibiting determination of the target speed by said target speed determining unit when the OFF state of the throttle valve is detected by said idle switch unit after the regulation of the throttle adjusting actuator by said actuator control unit is canceled by said fourth canceling means.

* * * * *